United States Patent
Chen et al.

(10) Patent No.: US 9,204,411 B2
(45) Date of Patent: Dec. 1, 2015

(54) SUPPORT OF MULTIPLE TIMING ADVANCE GROUPS FOR USER EQUIPMENT IN CARRIER AGGREGATION IN LTE

(75) Inventors: Wanshi Chen, San Diego, CA (US); Peter Gaal, San Diego, CA (US); Masato Kitazoe, Tokyo (JP); Jelena M. Damnjanovic, Del Mar, CA (US); Juan Montojo, Nuremberg (DE); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/610,139

(22) Filed: Sep. 11, 2012

(65) Prior Publication Data

US 2013/0064165 A1    Mar. 14, 2013

Related U.S. Application Data

(60) Provisional application No. 61/533,614, filed on Sep. 12, 2011, provisional application No. 61/610,151, filed on Mar. 13, 2012.

(51) Int. Cl.
*H04W 56/00* (2009.01)

(52) U.S. Cl.
CPC .............................. *H04W 56/0045* (2013.01)

(58) Field of Classification Search
None
See application file for complete search history.

(56) References Cited

U.S. PATENT DOCUMENTS

| | | | |
|---|---|---|---|
| 2011/0243102 A1* | 10/2011 | Sebire et al. ................. | 370/336 |
| 2011/0243111 A1 | 10/2011 | Andgart et al. | |
| 2012/0099577 A1 | 4/2012 | Baldemair et al. | |
| 2012/0250520 A1* | 10/2012 | Chen et al. .................... | 370/241 |

(Continued)

FOREIGN PATENT DOCUMENTS

| | | |
|---|---|---|
| JP | 2013516917 A | 5/2013 |
| JP | 2013519289 A | 5/2013 |
| WO | 2011085200 A1 | 7/2011 |

(Continued)

OTHER PUBLICATIONS

Huawei et al., "Discussion on TA group management", 36PP Draft; R2-113285 Discussion on TA Group Management, 3rd Generation Partnership Project (3GPP), Mobile Competence Centre; 650, Route Des Lucioles;F-06921 Soph IA-ANTI POL S Cedex; France, vol. RAN WG2, No. Barcelona, Spain; 20110589, May 3, 2011, XP050495423, [Retrieved on May 3, 2011].

(Continued)

*Primary Examiner* — Hassan Kizou
*Assistant Examiner* — Hashim Bhatti
(74) *Attorney, Agent, or Firm* — Norton Rose Fulbright US LLP

(57) ABSTRACT

Methods, systems, and devices are described to support multiple timing advance groups for multi-carrier user equipment. Some embodiments provide for utilizing timing advance group synchronization information across multiple timing advance groups. Some embodiments provide support for performing random access procedures in relation to timing advance groups that may not include a primary component carrier. Some embodiments utilize timing advance group indexes to enable cross-carrier random access procedure management. Other embodiments support parallel random access procedures across multiple timing advance groups. Some embodiments provide for a reference downlink component carrier for timing within a timing advance group.

60 Claims, 25 Drawing Sheets

(56) References Cited

U.S. PATENT DOCUMENTS

2012/0294272 A1    11/2012   Han et al.
2012/0300715 A1*   11/2012   Pelletier et al. .............. 370/329

FOREIGN PATENT DOCUMENTS

| WO | WO 2011085200 A1 * | 7/2011 | |
|----|--------------------|--------|--|
| WO | WO-2011096720 A2   | 8/2011 | |
| WO | WO2011124010 A1    | 10/2011 | |
| WO | WO 2012/041422 A2 * | 4/2012 | ............ H04W 56/00 |
| WO | WO2012041422 A2    | 4/2012 | |

OTHER PUBLICATIONS

International Search Report and Written Opinion—PCT/US2012/054848—ISA/EPO—Dec. 13, 2012.

Lucent A et al., "Timing reference and pathloss reference for SCell group", 3GPP Draft; R2-114321 PATHLOSSTIMINGREF_V5, 3rd Generation Partnership Project (3GPP), Mobile Competence Centre; 650, Route Des Lucioles ; F-06921 Sophia Anti POL1 S Cedex; France, vol. RAM WG2, No. Athens, Greece; 20110822, Aug. 16, 2011, XP050540051, [retrieved on Aug. 16, 2011].

Ericsson, et al: Timing reference for SCell time alignment [online], 3GPP TSG-RAN WG2#75 R2-114171, pp. 1-2 URL:http://www.3gpp.org/ftp/tsg_ran/WG2_RL2/TSGR2_75/Docs/R2-114171.zip, Aug. 22, 2011.

Qualcomm Inc: Timing reference cell for secondary TA group [online], 3GPP TSG-RAN WG2#77bis R2-121178, pp. 1-2 URL:http://www.3gpp.orgiftp/tsg_ran/WG2_RL2/TSGR2_77bis/Docs/R2-121178.zip, Mar. 26, 2012.

* cited by examiner

| Component Carriers | Timing Advance Group Index |
|---|---|
| Pcell<br><br>Scell-1<br><br>Scell-2 | 0 |
| Scell-3<br><br>Scell-4 | 1 |

FIG. 5

SUPPORT OF MULTIPLE TIMING ADVANCE GROUPS FOR USER EQUIPMENT IN CARRIER AGGREGATION IN LTE

CROSS-RELATED APPLICATIONS

The present Application for Patent claims priority to Provisional Application No. 61/533,614 entitled "SUPPORT OF MULTIPLE TIMING ADVANCE GROUPS FOR USER EQUIPMENT IN CARRIER AGGREGATION IN LTE" filed Sep. 12, 2011, and assigned to the assignee hereof and hereby expressly incorporated by reference herein for all purposes. The present Application for Patent also claims priority to Provisional Application No. 61/610,151 entitled "SUPPORT OF MULTIPLE TIMING ADVANCE GROUPS FOR USER EQUIPMENT IN CARRIER AGGREGATION IN LTE" filed Mar. 13, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communications system may include a number of base stations, each simultaneously supporting communication for multiple mobile terminals. Base stations may communicate with user equipment on downstream and upstream links. Each base station has a coverage range, which may be referred to as the coverage area of the cell. Some wireless multiple-access communications systems may utilize carrier aggregation, where multiple component carriers are aggregated and used together for transmission between base stations and user equipment. To achieve proper timing for transmission and reception on these different carriers, timing advance information may be distributed from base station to a user equipment to allow the device to account for propagation delay and/or delay due to other factors (e.g., repeaters) on different carriers. Timing advance information can help ensure synchronized reception timing of the uplink stream links transmitted from multiple mobile terminals. The multiple component carriers may be aggregated into different timing advance groups. In some cases, the multiple component carriers may be aggregated into different timing advance groups based on having similar delay characteristics. Synchronization issues, however, may arise for timing advance groups depending on the nature of the component carriers within a given timing advance group.

SUMMARY

Methods, systems, and devices are provided for utilizing timing advance group synchronization information across multiple timing advance groups. A reference downlink component carrier may be determined among multiple component carriers as part of a carrier aggregation operation. The reference downlink component carrier may be determined based on a Radio Resource Control (RRC) configuration of a user equipment. For example, RRC configuration message(s) may be transmitted to the user equipment identifying one carrier as a primary component carrier (PCC) and additional carriers as secondary component carriers (SCCs). The carrier that is identified as PCC may serve as the reference downlink carrier for multiple timing advance groups, including timing advance groups that may not include the PCC and may only include SCCs.

Some designs may provide advantages, for example, when the activation status of the SCCs changes from time to time. A timing advance group that contains SCCs, but no PCC, may face synchronization issues because of deactivation of the corresponding secondary cells. In contrast, a timing advance group with a primary cell that corresponds to a PCC may not face the same issues because the primary cell cannot be deactivated. Some aspects also provide advantages over some other techniques that may provide timing information for a timing advance group that include SCCs but no PCC, such as through SIB2 linkage. For example, when a secondary cell downlink component carrier is activated or deactivated, the SIB2 linked uplink component carrier is also generally activated or deactivated. As another example, the characteristics of a component carrier can be taken into account (activation status, whether it is equipped with a repeater, whether it is always on or periodically turned off, legacy or new carrier type, etc) in determining the reference downlink component carrier.

Some aspects include a method for utilizing timing advance group synchronization information across multiple timing advance groups. The method may include identifying multiple component carriers as part of a carrier aggregation operation. The multiple component carriers may include one or more downlink component carriers and two or more uplink component carriers. Multiple timing advance groups may be determined. Each component carrier in the multiple component carriers may be included in one of the timing advance groups. A first timing advance group from the multiple timing advance groups may be identified. A reference downlink component carrier may be determined for the first timing advance group based at least in part on a Radio Resource Control (RRC) configuration. The determined reference downlink component carrier may be utilized for timing adjustment within at least the first timing advance group.

The method may further include receiving an indication of a primary downlink component carrier through the RRC configuration. The primary downlink component carrier may be the determined reference downlink component carrier. Some embodiments include utilizing the primary downlink component carrier for timing adjustment within a second timing advance group from the multiple timing advance groups. The primary downlink component carrier may be included in the second timing advance group.

One or more downlink component carriers of the one or more identified downlink carriers may be included in the first timing advance group. Determining the reference downlink component carrier may be based on an RRC configuration for the one or more downlink component carriers in the first timing advance group. The reference downlink component carrier for the first timing advance group may be determined to be a downlink component carrier with a smallest cell index of multiple cell indices configured for each one of the one or more downlink component carriers in the first timing advance group.

The reference downlink component carrier may be determined from a set of activated downlink component carriers. The one or more downlink component carriers and the two or more uplink component carriers may be associated with two or more bands. The reference downlink component carrier for the first timing advance group may be determined from a set of downlink component carriers of the same band or similar band. As an example, the reference downlink component carrier may be determined to be a downlink component carrier of the same or similar band as an uplink component carrier associated with a random access attempt for the first timing advance group.

Some designs include performing multiple random access procedures in parallel with respect to two or more of the multiple timing advance groups. Performing the multiple random access procedures may include performing a first random access procedure linked with the first timing advance group; and/or performing a second random access procedure linked with a second timing advance group of the multiple timing advance groups, where one or more portions of the second random access procedure overlap with one or more portions of the first random access procedure.

Some aspects include initiating a non-contention based random access procedure on an uplink component carrier within the first timing advance group through utilizing a downlink control channel transmitted on a downlink component carrier that is not linked with the uplink component carrier via a system information block broadcast. A cross-carrier indication field may be included in the downlink control channel to enable cross-carrier scheduling.

The reference downlink component carrier for the first timing advance group may be determined from a set of downlink component carriers with a similar delay due to downlink repeaters. The reference downlink component carrier for the first timing advance group may be determined from a set of downlink component carriers with a same carrier type where the carrier type includes at least a legacy carrier type or a new carrier type. The reference downlink component carrier for the first timing advance group may be determined from a set of downlink component carriers with a similar activity factor.

Methods, systems, and devices are provided to support multiple timing advance groups for user equipment in carrier aggregation in LTE. Some embodiments provide support for random access for timing advance groups without a primary component carrier. Some embodiments utilize timing advance group indexes to enable cross-carrier random access procedure management. Other embodiments support parallel random access procedures across multiple timing advance groups. Some embodiments provide for a reference downlink component carrier for timing within a timing advance group.

Methods, systems, and/or devices for cross-carrier management for multiple timing advance groups are provided. In some embodiments, a method for cross-carrier management for multiple timing advance groups is provided. The method may include generating a timing advance group index. The timing advance group index may identify a timing advance group from multiple timing advance groups. Each group may include different sets of component carriers. The timing advance group index may be transmitted as part of a random access procedure.

In some embodiments, a first timing advance group from the multiple timing advance groups includes a primary component carrier and a second timing advance group includes at least one secondary component carrier. The first timing advance group may also include one or more secondary component carriers, while the second timing advance group does not include a primary component carrier. Some embodiments may also include additional timing advance groups besides the first and second timing advance group. The number of timing advance groups may depend upon a variety of factors including, but not limited, propagation delay characteristics, channel characteristics, user equipment device characteristics, and/or bandwidth characteristics of the component carriers.

In some embodiments, the timing advance group index is transmitted as a single bit of information. A first bit configuration of the single bit of information may indicate that the timing advance group includes a primary component carrier; a second bit configuration of the single bit may indicate that the timing advance group one or more secondary component carriers without the primary component carrier. Some embodiments may include timing advance indexes that may utilize additional bits to convey their information. The number of bits may depend upon the number of timing advance groups.

The timing advance group index may be transmitted as part of a MAC payload in some embodiments. The timing advance group index may be transmitted as part of a PDCCH payload. Some embodiments may also include transmitting a component carrier identifier as part of a Radio Resource Control (RRC) configuration to identify a component carrier within a timing advance group associated with a specific timing advance group index. The identified component carrier may be utilized for a random access attempt.

Some embodiments may enable cross-carrier random access response procedure management through the utilization of the timing advance group index. Some embodiments may enable cross-carrier PDCCH order through the utilization of the timing advance group index.

Methods, systems, and/or devices for providing cross-carrier management for multiple timing advance groups are provided. In some embodiments, a method for providing cross-carrier management for multiple timing advance groups is provided. The method may include receiving a timing advance group index as part of a random access procedure. The timing advance group index may be utilized to determine a timing advance group for transmitting data. Some embodiments may further include utilizing the timing advance group index to enable cross-carrier random access procedure management. Some embodiments may further include utilizing the timing advance group index to enable cross-carrier PDCCH order management. Some embodiments may further include receiving a component carrier identifier as part of a Radio Resource Control (RRC) configuration to identify a component carrier within a timing advance group associated with a specific timing advance group index, wherein the identified component carrier is utilized for a random access procedure.

Methods, system, and/or devices for performing multiple parallel random access procedures are provided. In some embodiments, a method for performing multiple parallel random access procedures is provided. The method may include performing a first random access procedure associated with a first timing advance group of component carriers. A second random access procedure associated with a second timing advance group of component carriers may be performed where one or more portions of the second random access procedure overlap with one or more portions of the first random access procedure.

Some embodiments may include performing a power prioritization with respect to the first random access procedure and the second random access procedure. Performing the power prioritization may include performing an equal power scaling with respect to the first random access procedure and the second random access procedure. In some embodiments, performing the power prioritization may include transmitting a first random access attempt with respect to the first timing advance group of component carriers prior to transmitting a second random access attempt with respect to the second timing advance group of component carriers, where the first timing advance group of component carriers includes a primary component carrier.

In some embodiments, the first random access procedure may include a non-contention-based random access procedure and the second random access procedure may include a contention based random access procedure. Performing the power prioritization in this case may include transmitting a first random access attempt with respect to the first timing advance group of component carriers prior to transmitting a second random access attempt with respect to the second timing advance group of component carriers.

Some embodiments may include configuring a first subframe that includes a first random access response as part of the first random access procedure. A second subframe including a second random access response may be configured as part of the second random access procedure. The first subframe and the second subframe may be transmitted. As a result, the first and second random access responses may not be transmitted in the same subframe. Some embodiments may include triggering an aperiodic channel quality indicator (A-CQI).

Methods, systems, and/or devices for utilizing timing advance group synchronization information are provided. In some embodiments, a method for utilizing timing advance group synchronization information is provided. The method may include determining a reference downlink component carrier. The reference downlink component carrier may be utilized for timing adjustment within a first timing advance group from multiple timing advance groups. Each timing advance group may include at least one downlink component carrier.

In some embodiments, a second timing advance group includes a primary component carrier. In some embodiments, determining the reference downlink component carrier includes utilizing a downlink component carrier linked with an uplink component carrier associated with a random access attempt to determine the reference downlink component carrier. The downlink component carrier may be linked with the uplink component carrier through a SIB2 linkage. In some embodiments, determining the reference downlink component carrier may include determining the reference downlink component carrier from a Radio Resource Control (RRC) configuration. The reference downlink carrier may be indicated as a primary component carrier (PCC) in the RRC configuration. The PCC may be utilized as a timing reference within a second timing advance group from the multiple timing advance groups.

Methods, systems, and/or devices for performing random access by a multi-carrier user equipment (UE) are provided. In some embodiments, the UE receives a downlink control message configured to initiate a random access procedure. The UE transmits a response to the downlink control message on a physical random access channel (PRACH). The UE may receive an access grant on a primary component carrier and determine a set of secondary component carriers (SCCs) based on the random access grant. The UE may complete the random access procedure using a carrier in the set of SCCs to obtain timing advance information applicable to the set of SCCs. Receiving the downlink control message may include detecting a physical downlink control channel (PDCCH) message in a UE-specific search space. Receiving the random access grant may include detecting a PDCCH message in a common search space of the PCC.

In some embodiments, the method may further include obtaining a medium access control (MAC) protocol data unit (PDU) with the random access grant. A timing advance (TA) group index may be determined corresponding to the set of SCCs based on the MAC PDU. Some embodiments may further include receiving a configuration of TA groups corresponding to the component carriers configured for the UE. The configuration of TA groups may include at least a first TA group including the PCC, and a second TA group including the set of secondary CCs (and not the PCC). Some embodiments may further include determining a reference downlink CC for completing the random access procedure based on the TA group index. In some embodiments, the method may further include determining a TA group index corresponding to the set of SCCs as part of a PDCCH payload.

In some embodiments, the downlink control message configured to initiate the random access procedure comprises an identifier corresponding to the set of SCCs, and transmitting the response to the downlink control message further include determining an SCC to transmit the PRACH based on the identifier.

The random access procedure may include a first random access procedure of the UE. The method may further include initiating a second random access procedure concurrently with the first random access procedure. Some embodiments may include determining a priority for allocating power between the first random access procedure and the second random access procedure. Some embodiments may further include allocating power to the first random access procedure at a higher priority than the second random access procedure when the first random access procedure comprises a contention-free random access procedure and the second random access procedure comprises a contention-based random access procedure. Some embodiments may further include allocating power to the second random access procedure at a higher priority than the first random access procedure when the second random access procedure when the second random access procedure is performed in relation to a group of carriers comprising a primary component carrier of the UE. Determining the priority may include performing an equal power scaling for each CC.

Methods, systems, and/or device for performing random access by a base station are provided. In some embodiments, the base station may transmit a downlink control message configured to initiate a random access procedure at a user equipment. The base station may receive a response to the downlink control message on a PRACH. Thereafter, the base station may transmit an access grant on a PCC of a user equipment, wherein the access grant includes information regarding a set of SCCs. TA information applicable to the set of SCCs may also be transmitted using a carrier in the set of SCCs.

Transmitting the downlink control message may include transmitting a PDCCH message in a UE-specific search space. Transmitting the random access grant may include transmitting a PDCCH message in a common search space of the PCC.

In some embodiments, the method for performing random access by a base station may further include transmitting a MAC PDU with the random access grant. A TA group index corresponding to the set of SCCs with the random access grant may be transmitted. The base station may configure the component carriers configured for the UE into multipl TA groups and may transmit the TA group configuration to the UE. The base station may include a TA group index as part of the MAC PDU during the random access procedure. The configuration of TA groups may include at least a first TA group including the PCC, and a second TA group including the set of secondary CCs. A reference downlink CC may be transmitted for completing the random access procedure based on the TA group index.

In some embodiments, a method for performing random access by a base station may further include transmitting a TA group index corresponding to the set of SCCs as part of a PDCCH payload. In some embodiments, the downlink control message configured to initiate the random access procedure may include an identifier corresponding to the set of SCCs. Receiving the response to the downlink control message may further include receiving the PRACH on an SCC based on the identifier.

The above methods may be implemented utilizing a variety of wireless communications systems that may include means for performing one or more of the methods, wireless communications devices that may include a processor configured to perform one or more of the methods, and/or computer program products including a computer readable storage medium may that includes code to perform one or more of the methods.

The foregoing has outlined rather broadly examples according to disclosure in order that the detailed description that follows may be better understood. Additional features will be described hereinafter. The specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 is an example of a timing advance group index table in accordance with various embodiments;

DETAILED DESCRIPTION

Figure 1:
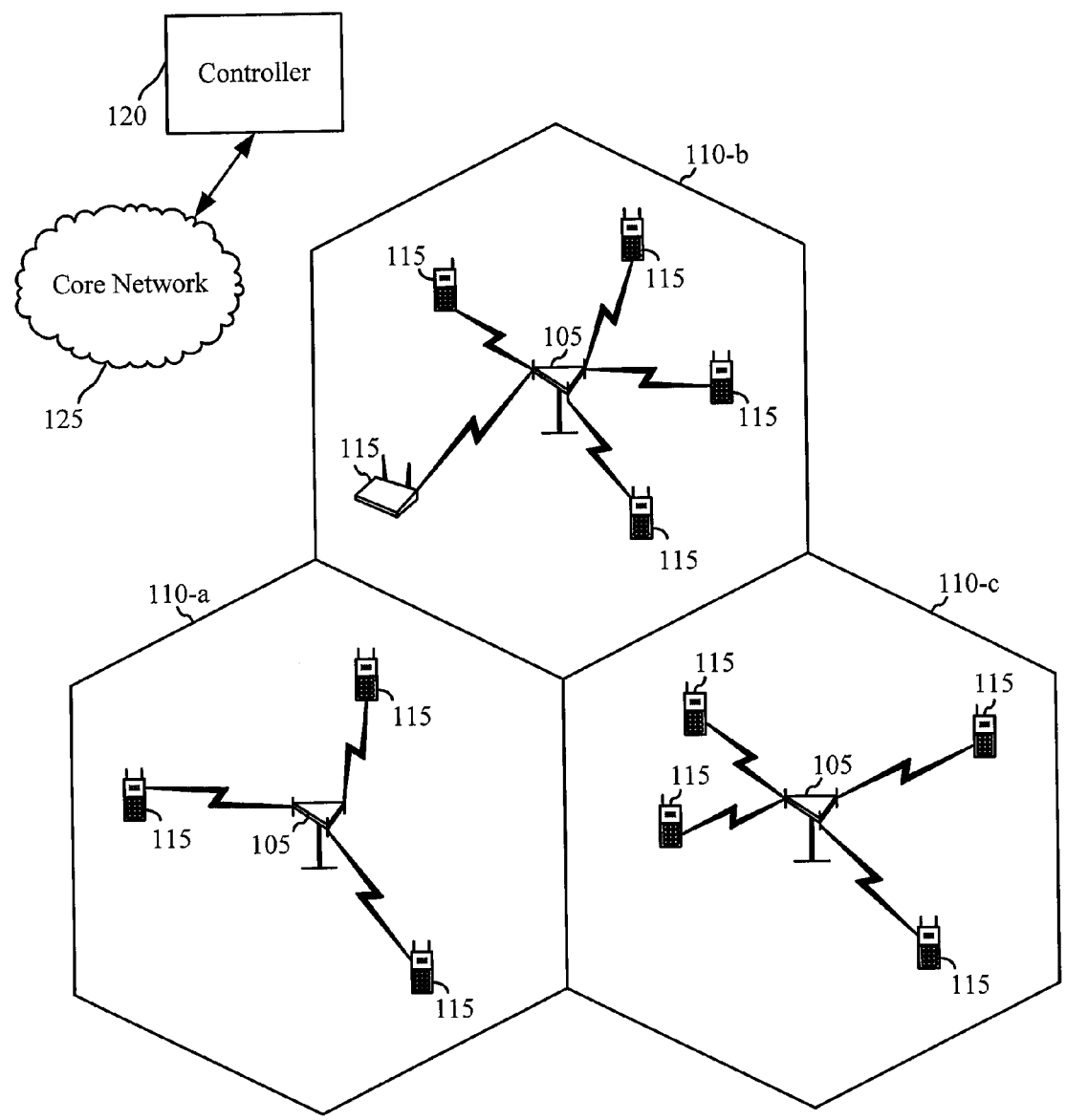
FIG. 1 is a block diagram illustrating a wireless communications system in accordance with various embodiments.

Methods, systems, and devices are described to support multiple timing advance groups for multi-carrier user equipment. Timing advance group synchronization information across multiple timing advance groups may be provided. Support for performing random access procedures in relation to timing advance groups that may not include a primary component carrier may be provided in some designs. Timing advance group indexes may be utilized to enable cross-carrier random access procedure management. Other aspects may support parallel random access procedures across multiple timing advance groups. A reference downlink component carrier for timing within a timing advance group may be provided in some cases.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Various techniques described herein may be used for different wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies. The description above, however, describes an LTE and/or LTE-Advanced system for purposes of examples, and LTE terminology is used in much of the description above, although the techniques are applicable beyond LTE applications.

Referring first to FIG. 1, a block diagram illustrates an example of a wireless communications system 100. The system 100 includes base transceiver stations 105, disposed in cells 110, mobile user equipment 115 (UEs), controller 120, and core network 125. It is worth noting that terms like user equipment (UE), mobile device, mobile device, access terminal, and others are used interchangeably herein and are not intended to imply a particular network topology or implementation.

The system 100 may support operation on multiple carriers (waveform signals of different frequencies) and/or carrier aggregation. With carrier aggregation, a user equipment 115 may be configured by a serving base station 105 to communicate using multiple component carriers (CCs). The CCs configured for the UE 115 may include uplink CCs and downlink CCs, which may be further described as primary component carriers (PCCs) or secondary component carriers (SCCs). In one example of system 100, for each UE 115, one CC is designated as the PCC for uplink and downlink transmissions and additional CCs are designated as SCCs. As discussed in more detail below, these different CCs may be aggregated into different timing advance groups based on different factors, such as their delay characteristics. Different embodiments may address different synchronization issues that may arise for timing advance groups depending on the nature of the component carriers within a given timing advance group.

The base stations 105 can wirelessly communicate with the user equipment 115 via a base station antenna. The base stations 105 may be configured to communicate with the user equipment 115 under the control of the controller 120 via multiple carriers. Each of the base stations 105 can provide communication coverage for a respective geographic area, here the cells 110-a, 110-b, or 110-c. The system 100 may include base stations 105 of different types, e.g., macro, pico, and/or femto base stations. The base stations 105 may include Node B, Home Node B, eNode B, and/or Home eNode B base stations.

The user equipment 115 can be dispersed throughout the cells 110. The user equipment 115 may be referred to as mobile stations, mobile devices, user equipment (UE), or subscriber units. The user equipment 115 here include cellular phones and a wireless communication device, but can also include personal digital assistants (PDAs), other handheld devices, netbooks, notebook computers, etc.

For the discussion below, the user equipment 115 may operate on (are "camped" on) a macro or similar network facilitated by multiple macro base stations 105. Each macro base station 105 may cover a relatively large geographic area (e.g., several kilometers in radius) and may allow unrestricted access by terminals with a service subscription.

System 100 may be an LTE system that supports multiple timing advance groups for user equipment 115 in carrier aggregation. With carrier aggregation, multiple component carriers may be aggregated and used together for transmission between base stations 105 and UEs 115. To achieve proper timing for transmission and reception on these different carriers, timing advance information may be distributed from base stations 105 to UEs 115 to allow the UEs 115 to account for propagation delay and/or delay due to other factors (e.g., repeaters) on different carriers. Timing advance information can help ensure synchronized reception timing of the uplink stream links transmitted from multiple UEs 115. The multiple component carriers (CCs) may be aggregated into different timing advance groups. In some cases, the multiple component carriers may be aggregated into different timing advance groups based on having similar delay characteristics. Synchronization issues, however, may arise for timing advance groups depending on the nature of the component carriers within a given timing advance group. System 100 may provide different solutions to these problems in accordance with various embodiments.

For example, different CCs may have different delay characteristics for UEs 115. Multiple CCs may be aggregated into different timing advance groups based on having similar delay characteristics. Uplink transmissions from multiple UEs 115 generally need to be properly aligned. This generally involves utilizing one or more references for timing adjustments. One natural approach may involve utilizing SIB2 linkage between uplink CCs and downlink CCs.

With timing advance groups, CCs with similar characteristics can be grouped together. Different timing advance groups may thus involve different considerations with respect to timing references, such as a reference CC. For example, a secondary CC can be activated and deactivated, while a primary CC is generally always activated. In some cases, a system may benefit through not providing UEs 115 autonomy in selecting a reference CC. Instead, a PCC may be utilized as a reference CC in general. While a PCC may be utilized as a reference CC across different timing advance groups, different implementations may utilize different offsets with respect to the PCC for CCs in different timing advance groups. As discussed in more detail below, determining a reference downlink CC, such as a PCC, may be based in part on a Radio Resource Control (RRC) configuration by user equipment 115.

For example, in some embodiments, user equipment 115 may be configured for utilizing timing advance group synchronization information across multiple timing advance groups. User equipment 115 may be configured to identify multiple component carriers as part of a carrier aggregation operation. The multiple component carriers may include one or more downlink component carriers and two or more uplink component carriers. Multiple timing advance groups may be determined by user equipment 115. Each component carrier in the multiple component carriers may be included in one of the timing advance groups. A first timing advance group from the multiple timing advance groups may be identified by user equipment 115. A reference downlink component carrier may be determined for the first timing advance group based at least in part on a RRC configuration by user equipment 115. The determined reference downlink component carrier may be utilized by user equipment 115 for timing adjustment within at least the first timing advance group.

In some embodiments, user equipment 115 may receive from base station 105 an indication of a primary downlink component carrier through the RRC configuration. The primary downlink component carrier may be the determined reference downlink component carrier.

User equipment 115 may utilize the primary downlink component carrier for timing adjustment within a second timing advance group from the multiple timing advance groups. The primary downlink component carrier may be included in the second timing advance group.

In some embodiments, one or more downlink component carriers of the one or more identified downlink carriers is included in the first timing advance group. Determining the reference downlink component carrier by user equipment 115 may be based on an RRC configuration for the one or more downlink component carriers in the first timing advance group. The reference downlink component carrier for the first timing advance group may be determined by user equipment 115 to be a downlink component carrier with a smallest cell index of multiple cell indices configured for each one of the one or more downlink component carriers in the first timing advance group.

User equipment 115 may determine the reference downlink component carrier from a set of activated downlink component carriers. The one or more downlink component carriers and the two or more uplink component carriers may be associated with two or more bands. The reference downlink component carrier for the first timing advance group may be determined from a set of downlink component carriers of the same band or similar band. As an example, the reference downlink component carrier may be determined to be a downlink component carrier of the same or similar band as an uplink component carrier associated with a random access attempt for the first timing advance group.

User equipment 115 may perform multiple random access procedures in parallel with respect to two or more of the multiple timing advance groups. Performing the multiple random access procedures may include performing a first random access procedure linked with the first timing advance group; and/or performing a second random access procedure linked with a second timing advance group of the multiple timing advance groups, where one or more portions of the second random access procedure overlap with one or more portions of the first random access procedure.

User equipment 115 may initiate a non-contention based random access procedure on an uplink component carrier within the first timing advance group through utilizing a downlink control channel transmitted on a downlink component carrier that is not linked with the uplink component carrier via a system information block broadcast. A cross-carrier indication field may be included in the downlink control channel to enable cross-carrier scheduling.

The reference downlink component carrier for the first timing advance group may be determined by user equipment 115 from a set of downlink component carriers with a similar delay due to downlink repeaters. The reference downlink component carrier for the first timing advance group may be determined by user equipment 115 from a set of downlink component carriers with a same carrier type where the carrier type includes at least a legacy carrier type or a new carrier type. The reference downlink component carrier for the first timing advance group may be determined by user equipment 115 from a set of downlink component carriers with a similar activity factor.

System 100, such as through user equipment 115 and/or base station 105, may take into account different characteristics of a component carrier (e.g., whether it is equipped with a repeater, whether it is always on or periodically turned off, whether it is a new or legacy carrier type, etc.) in determining the reference downlink component carrier. A component carrier may be equipped with a repeater while another component carrier is not. In determining the reference downlink component carrier for a given timing advance group, the component carriers of the same or similar delay characteristics due to repeaters (either downlink repeaters, or uplink repeaters, or a combination thereof) may be determined to be possible candidates for the reference downlink component carrier for the given timing advance group. Different component carriers may have different activity factors. A component carrier may periodically be turned on and carries much less frequent downlink information compared with a regular carrier. It may then be preferable to avoid using this component carrier as the reference downlink component carrier. A component carrier may be of a legacy carrier type and another can be of a new carrier type. Carriers of the same type may be determined to be possible candidates for the reference downlink component carrier for a given timing advance group.

In some embodiments, base stations 105 and/or user equipment 115 may be configured to support multiple timing advance (TA) groups in connection with random access procedures. For example, different timing advance information may be transmitted to user equipment 115 for different groups of uplink carriers as part of the random access process. First timing advance information may be applicable to a first subset of uplink carriers, while second timing advance information may be applicable to a second, different subset of uplink carriers (e.g., due to a repeater) configured for a particular user equipment 115. A user equipment 115 may support two or more timing advance groups and, in some aspects, the user equipment 115 may conduct parallel random access procedures to obtain timing adjustment information applicable to the carriers in each group. Some timing advance groups may not include the primary component carrier, and different specifications may be applicable to such groups.

As described herein, system 100 can support random access procedures for timing advance groups without a primary component carrier. In some aspects, random access procedures between base stations 105 and user equipment 115 may utilize messages in different search spaces and/or different component carriers. Some messages may be transmitted in a user equipment-specific search space ("UESS"). Other messages may be transmitted in a common search space ("CSS") on the primary component carrier. Additional embodiments may utilize a common search space on a secondary component carrier. Some embodiments may utilize non-contention based random access procedures, while other embodiments may utilize contention based random access procedures. More details are discussed herein with respect to providing support for random access for timing advance groups without a primary carrier component.

Some embodiments utilize timing advance group indexes to enable cross-carrier random access procedure management. For example, as part of a random access procedure, a base station 105 may transmit a random access response to a user equipment 115 that includes a timing advance group index. Using the TA group index, the user equipment 115 may determine a carrier with which to complete the random access procedure. Different aspects of cross-carrier management, including random access response management, may be facilitated using timing advance group index information. More details are discussed herein with respect to utilizing timing advance group indexes to enable cross-carrier random access procedure management.

Some embodiments support parallel random access procedures across multiple timing advance groups. For example, multiple parallel random access procedures may occur between base station 105 and user equipment 115. Some embodiments may utilize power prioritization to facilitate these overlapping access procedures. Some embodiments may provide for an Aperiodic Channel Quality Indicator (A-CQI) being triggered within these parallel random access procedures. More details are discussed herein with respect to supporting parallel random access procedures across multiple timing advance groups.

Some embodiments provide for a reference downlink component carrier for timing within a timing advance group. For example, user equipment 115 may utilize a reference downlink component carrier from base station 105 for timing within a timing advance group. More details are discussed herein with respect to providing for a reference downlink component carrier for timing within a timing advance group.

Figure 2:
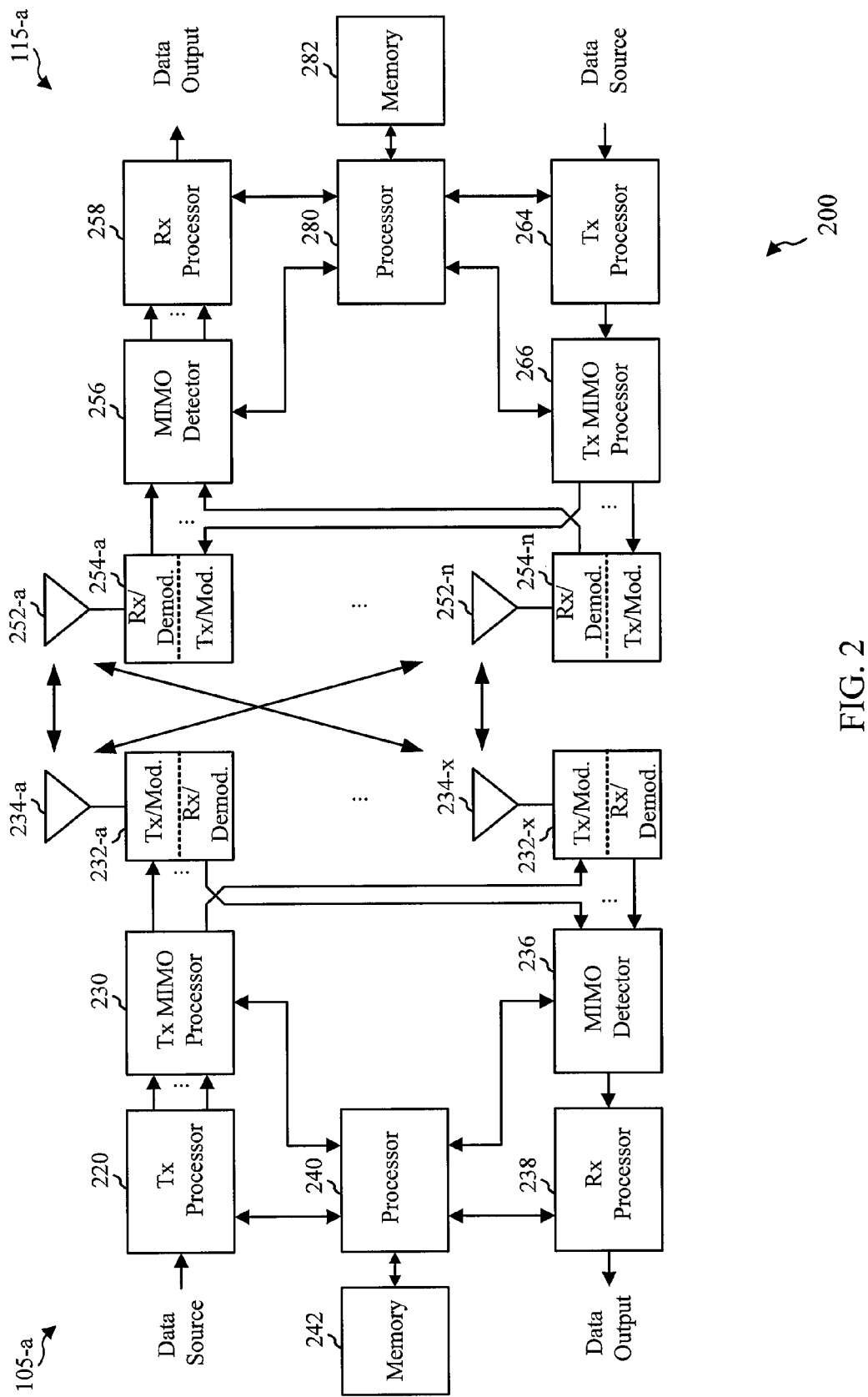
FIG. 2 is a block diagram illustrating a wireless communications system in accordance with various embodiments.

FIG. 2 is a block diagram of a wireless communication system 200 including a base station 105-*a* and a user equipment 115-*a*. This system 200 may be an example of the system 100 of FIG. 1. The base station 105-*a* may be equipped with antennas 234-*a* through 234-*x*, and the user equipment 115-*a* may be equipped with antennas 252-*a* through 252-*n*. At the base station 105-*a*, a transmit processor 220 may receive data from a data source.

The transmit processor 220 and/or processor 240 may process and/or transmit data. The transmit processor 220 may also generate reference symbols and a cell-specific reference signal. A transmit (TX) MIMO processor 230 may perform spatial processing (e.g., precoding) on data symbols, control symbols, and/or reference symbols, if applicable, and may provide output symbol streams to the transmit modulators 232-*a* through 232-*x*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink (DL) signal. In one example, DL signals from modulators 232-*a* through 232-*x* may be transmitted via the antennas 234-*a* through 234-*x*, respectively.

Processor 240, TX MIMO processor 230, and/or transmit processor 220 may be configured in some embodiments to support random access procedures for timing advance groups without a primary component carrier (e.g., a TA group that includes only secondary component carriers). In particular, these processors may be configured to conduct a random access procedure by which user equipment 115-*a* achieves uplink synchronization with base station 105-*a*. Random access procedures may involve the exchange of a series of messages on different carriers and/or different channels. The base station 115-*a* may send messages in a common search space (or control region) that is monitored by all UEs 115 in a cell, or it may send messages in a search space that is defined for a particular UE. For example, a UE-specific search space may be defined by with a starting offset for blind decodes in the PDCCH.

As described herein, random access procedures may be classified as contention-free or contention-based. With a contention-free procedure, for example, base station 105-*a* may transmits a physical downlink control channel (PDCCH) order indicating a random access preamble and physical random access channel (PRACH) resource for the UE 115-*a* to send signaling and data on a physical uplink shared channel (PUSCH). Alternatively, with a contention-based random access procedure, the UE may select the random access preamble and PRACH resource.

Processor 240, TX MIMO processor 230, and/or transmit processor 220 may be configured enable cross-carrier random access procedure management. For example, processor 240, TX MIMO processor 230, and/or transmit processor 220 may transmit random access responses to user equipment 115-*a* that include a timing advance group index as part of a random access procedure. In one example of a contention-free random access procedure, base station 105-*a* transmits a PDCCH message in a UE-specific search space of a secondary component carrier which is included in a particular TA group. In response to a PRACH transmission from UE 115-*a*, base station 105-*a* transmits a random access response (RAR) PDCCH in a common search space of the PCC. An RAR message associated with the PDCCH may convey an index corresponding to a timing advance group. The timing advance group may include only SCCs (including the SCC utilized to initiate the random access procedure). The timing advance group index may enable cross-carrier RAR to a secondary SCC as part of the random access procedure. Different aspects of cross-carrier management, including random access response management, may be facilitated using timing advance group index information.

Processor 240, TX MIMO processor 230, and/or transmit processor 220 may also be configured in some embodiments to transmit reference downlink component carrier information for timing within a timing advance group to user equipment 115-*a*.

At the user equipment 115-*a*, the user equipment antennas 252-*a* through 252-*n* may receive the DL signals from the base station 105-*a* and may provide the received signals to the demodulators 254-*a* through 254-*n*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-*a* through 254-*n*, perform MIMO detection on the received symbols if applicable, and provide detected symbols. A receive processor 258 may process (e.g., demodulate, deinterleave, and decode) the detected symbols, providing decoded data for the user equipment 115-*a* to a data output, and provide decoded control information to a processor 280, or memory 282.

The received signals at the user 115-*a* from base station 105-*a* may be utilized for a variety of purposes with respect to different embodiments. For example, the receive processor 258 and/or the processor 280 may process information according to different embodiments. Some embodiments may configure receive processor 258 and/or the processor 280 to support random access for timing advance groups without a primary component carrier. These embodiments may utilize different search spaces that the receive processor 258 and/or the processor 280 may examine to determine information that may be utilized during a random access procedure. In general, the receive processor 258 and/or the processor 280 may be configured to receive and determine information from different random access response (RAR) grants that utilize different search spaces. These search spaces may include, but are not limited to, UE-specific search spaces on the PCC and SCCs, a common search space on PCC, and/or common search spaces on secondary component carriers.

Some embodiments may involve configuring the receive processor 258 and/or the processor 280 to utilize timing advance group indexes to enable cross-carrier random access procedure management. For example, the receive processor 258 and/or the processor 280 may receive random access responses from base station 105-*a* that includes a timing advance group index as part of a random access procedure. The receive processor 258 and/or the processor 280 may then utilize this index information for cross-carrier management, including random access response management.

The receive processor 258 and/or the processor 280 may also be configured to receive reference downlink component carrier information from base station 105-*a*. The receive processor 258 and/or the processor 280 may utilize this reference downlink component carrier information for timing within a timing advance group.

On the uplink (UL), at the user equipment 115-*a*, a transmit processor 264 may receive and process data from a data source. The transmit processor 264 may also generate reference symbols for a reference signal. The symbols from the transmit processor 264 may be precoded by a transmit MIMO processor 266 if applicable, further processed by the demodulators 254-*a* through 254-*n* (e.g., for SC-FDMA, etc.), and be transmitted to the base station 105-*a* in accordance with the transmission parameters received from the base station 105-*a*. At the base station 105-*a*, the UL signals from the user equipment 115-*a* may be received by the antennas 234, processed by the demodulators 232, detected by a MIMO detector 236 if applicable, and further processed by a receive processor. The receive processor 238 may provide decoded data to a data output and to the processor 240.

In some embodiments, processor 280 and/or other components of user equipment 115-*a* may be configured for utilizing timing advance group synchronization information across multiple timing advance groups. Processor 280 and/or other components of user equipment 115-*a* may be configured to identify multiple component carriers as part of a carrier aggregation operation. The multiple component carriers may include one or more downlink component carriers and two or more uplink component carriers. Multiple timing advance groups may be determined by processor 280 and/or other components of user equipment 115-*a*. Each component carrier in the multiple component carriers may be included in one of the timing advance groups. A first timing advance group from the multiple timing advance groups may be identified by processor 280 and/or other components of user equipment 115-*a*. A reference downlink component carrier may be determined for the first timing advance group based at least in part on a RRC configuration by user equipment processor 280 and/or other components of user equipment 115-*a*. The determined reference downlink component carrier may be utilized by user equipment 115 for timing adjustment within at least the first timing advance group.

In some embodiments, processor 280 and/or other components of user equipment 115-*a* may receive from base station 105-*a* an indication of a primary downlink component carrier through the RRC configuration. The primary downlink component carrier may be the determined reference downlink component carrier.

Processor 280 and/or other components of user equipment 115-*a* may utilize the primary downlink component carrier for timing adjustment within a second timing advance group from the multiple timing advance groups. The primary downlink component carrier may be included in the second timing advance group.

In some embodiments, one or more downlink component carriers of the one or more identified downlink carriers is included in the first timing advance group. Determining the reference downlink component carrier by processor 280 and/or other components of user equipment 115-*a* may be based on an RRC configuration for the one or more downlink component carriers in the first timing advance group. The reference downlink component carrier for the first timing advance group may be determined by processor 280 and/or other components of user equipment 115-*a* to be a downlink component carrier with a smallest cell index of multiple cell indices configured for each one of the one or more downlink component carriers in the first timing advance group.

Processor 280 and/or other components of user equipment 115-*a* may determine the reference downlink component carrier from a set of activated downlink component carriers. The one or more downlink component carriers and the two or more uplink component carriers may be associated with two or more bands. The reference downlink component carrier for the first timing advance group may be determined from a set of downlink component carriers of the same band or similar band. As an example, the reference downlink component carrier may be determined to be a downlink component carrier of the same or similar band as an uplink component carrier associated with a random access attempt for the first timing advance group.

Processor 280 and/or other components of user equipment 115-*a* may perform multiple random access procedures in parallel with respect to two or more of the multiple timing advance groups. Performing the multiple random access procedures may include performing a first random access procedure linked with the first timing advance group; and/or performing a second random access procedure linked with a second timing advance group of the multiple timing advance groups, where one or more portions of the second random access procedure overlap with one or more portions of the first random access procedure.

Processor 280 and/or other components of user equipment 115-*a* may initiate a non-contention based random access procedure on an uplink component carrier within the first timing advance group through utilizing a downlink control channel transmitted on a downlink component carrier that is not linked with the uplink component carrier via a system information block broadcast. A cross-carrier indication field may be included in the downlink control channel to enable cross-carrier scheduling.

The reference downlink component carrier for the first timing advance group may be determined by processor 280 and/or other components of user equipment 115-*a* from a set of downlink component carriers with a similar delay due to downlink repeaters. The reference downlink component carrier for the first timing advance group may be determined by processor 280 and/or other components of user equipment 115-*a* from a set of downlink component carriers with a same carrier type where the carrier type includes at least a legacy carrier type or a new carrier type. The reference downlink component carrier for the first timing advance group may be determined by processor 280 and/or other components of user equipment 115-*a* from a set of downlink component carriers with a similar activity factor.

Transmit processor 264 and/or processor 280 may be configured in some embodiments to support parallel random access procedures across multiple timing advance groups. For example, multiple parallel random access procedures may occur between base station 105-*a* and user equipment 115-*a*. Transmit processor 264 and/or processor 280 may be configured to utilize power prioritization to facilitate these overlapping access procedures. Transmit processor 264 and/or processor 280 may be configured to provide for an Aperiodic Channel Quality Indicator (A-CQI) being triggered within these parallel random access procedures.

Figure 3A:
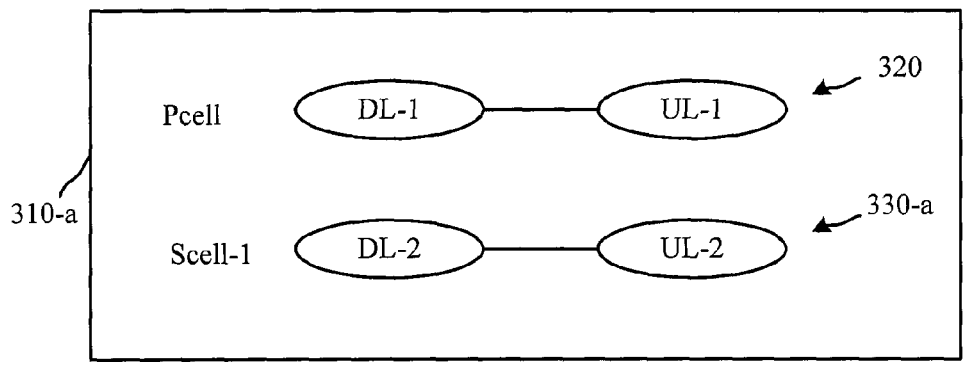
FIG. 3A illustrates a configuration of timing advance groups in accordance with various embodiments.
Figure 3A:
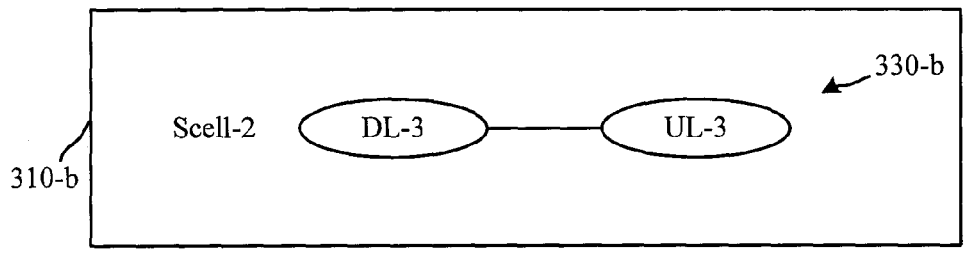

FIG. 3A shows an example of a configuration 300-*a* of timing advance groups in accordance with various embodiments. Two or more timing advance groups may be configured in various embodiments. Configuration 300 shows two timing advance groups 310-*a* and 310-*b*. In some embodiments, a base station, such as a serving eNodeB, may configure the timing advance groups utilizing dedicated signaling. Typically, one of the timing advance groups includes a primary cell 320. In this example, timing advance group 310-*a* includes primary cell 320. Primary cell 320 includes uplink and downlink primary component carriers, UL-1 and DL-1 respectively. Timing group 310-*a* also includes a secondary cell 330-*a*, which includes an uplink component carrier UL-2 and a downlink component carrier DL-2. In this example, the second timing advance group 310-*b* includes another secondary cell, labeled 330-*b*, with a downlink component carrier DL-3 and an uplink component carrier UL-3. While this example shows two timing advance groups, other embodiments may include more timing advance groups. In addition, different timing advance groups may include more or fewer secondary cells 330. As will be discussed in more detail below, a timing advance group that does not include a primary cell, such as timing advance group 310-*b*, may have a random access process triggered for the timing advance group by an order, such as a PDCCH order, addressed to an active secondary cell in the timing advance group.

Figure 3B:
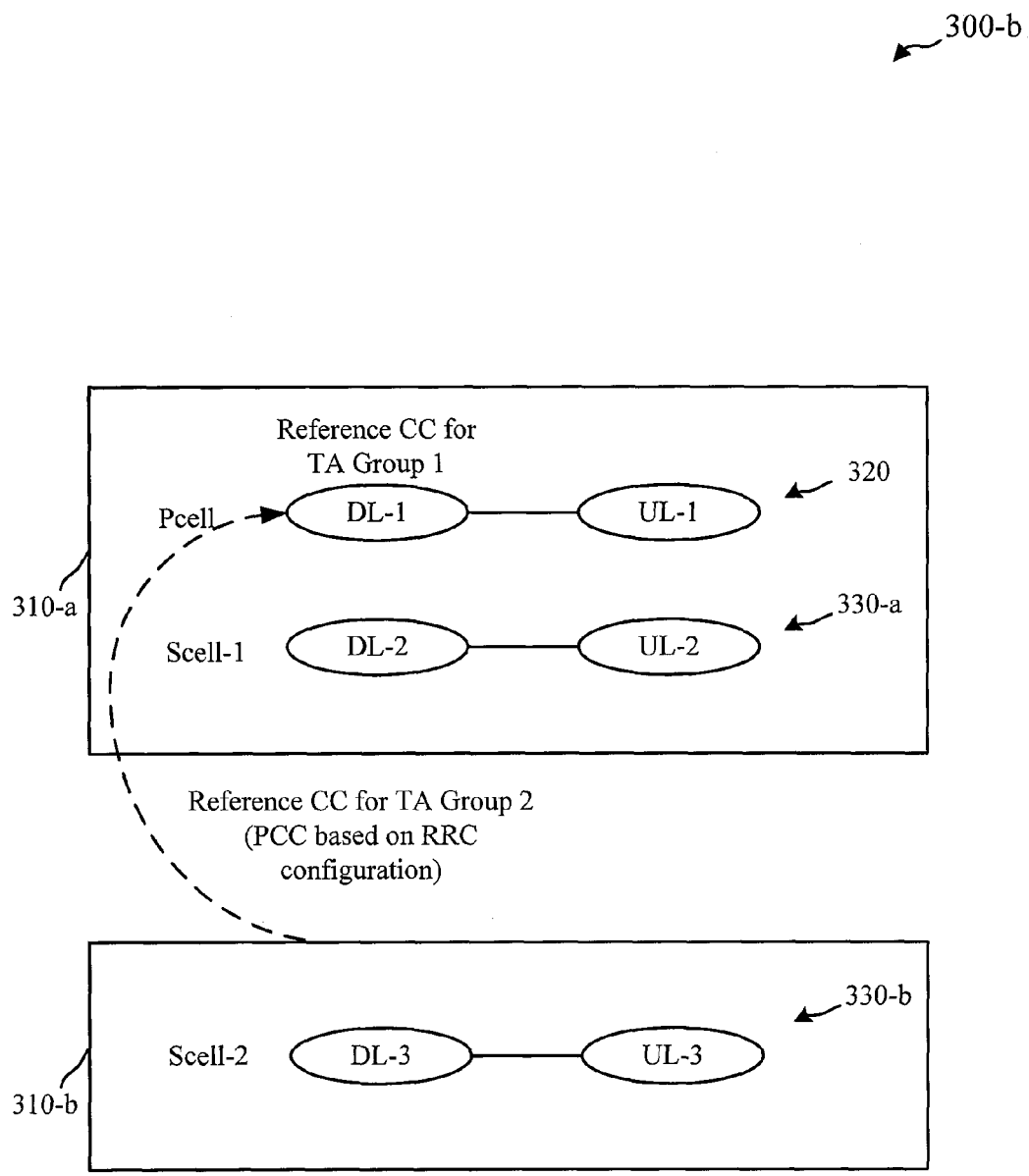
FIG. 3B illustrates a further configuration of timing advance groups in accordance with various embodiments.

FIG. 3B shows an example of a configuration 300-*b* of timing advance groups in accordance with various embodiments and based on configuration 300-*a* of FIG. 3A. Configuration 300-*b* shows an example where an RRC-configured primary downlink component carrier (DL-1) may serve as the reference carrier for component carriers in each of the two timing advance groups 310-*a*, 310-*b*. This RRC-based approach may be advantageous when the activation status of the secondary downlink component carriers (DL-2, DL-3) changes from time to time. In some cases, a reference downlink component carrier may be determined based on an RRC configuration of user equipment 115. For example, as previously described for carrier aggregation, a base station, such as a base station 105 of the other figures, may send RRC configuration message(s) to user equipment 115 identifying one carrier as the primary component carrier (PCC) and additional carriers as secondary component carriers (SCCs). The carrier that is identified as PCC may serve as the reference downlink carrier for one or more timing advance groups 310.

For example, configuration 300-*b* may be an example of utilizing timing advance group synchronization information across multiple timing advance groups by a user equipment, such as the user equipment 115 of FIGS. 1, 2, 4, 7B, 8B, and/or 9B. With configuration 300-*b*, multiple component carriers, such as UL-1, UL-2, UL-3, DL-1, DL-2, and/or DL-3, may be identified as part of a carrier aggregation operation. The multiple component carriers may include one or more downlink component carriers (e.g., DL-1, DL-2, and/or DL-3) and two or more uplink component carriers (e.g., UL-1, UL-2, and/or UL-3). Multiple timing advance groups, such as timing advance groups 310-*a* and 310-*b*, may be determined. Each component carrier in the multiple component carriers may be included in one of the timing advance groups. A first timing advance group, such as timing advance group 310-*b*, from the multiple timing advance groups may be identified. A reference downlink component carrier, such as DL-1, may be determined for the first timing advance group based at least in part on an RRC. The determined reference downlink component carrier may be utilized for timing adjustment within at least the first timing advance group. The determined reference downlink component carrier may also be utilized for other timing advance groups, such as timing advance group 310-*a*. In some cases, timing offset information may be utilized along with timing information from the determined downlink component carrier to determine timing information for the different timing advance groups.

In some embodiments, an indication of a primary downlink component carrier (e.g., DL-1) may be received through the RRC configuration. The primary downlink component carrier may be the determined reference downlink component carrier. The primary downlink component carrier may be utilized for timing adjustment within a second timing advance group (e.g., timing advance group 310-*a*) from the multiple timing advance groups. The primary downlink component carrier may be included in the second timing advance group.

In some embodiments, one or more downlink component carriers of the one or more identified downlink carriers is included in the first timing advance group, such as DL-3 of timing advance group 310-*b*. Determining the reference downlink component carrier may be based on an RRC configuration for the one or more downlink component carriers in the first timing advance group. The reference downlink component carrier for the first timing advance group may be determined to be a downlink component carrier with a smallest cell index in the first timing advance group, which is the primary component carrier. As another example, although not illustrated, the second timing advance group may have two or more secondary component carriers, and the reference downlink component for the second timing advance group may be determined to be a downlink component carrier with a smallest cell index within the second timing advance group.

The reference downlink component carrier may be determined from a set of activated downlink component carriers. The one or more downlink component carriers and the two or more uplink component carriers may be associated with two or more bands. The reference downlink component carrier for the first timing advance group may be determined from a set of downlink component carriers of the same band or similar band. As an example, the reference downlink component carrier may be determined to be a downlink component carrier of the same or similar band as an uplink component carrier associated with a random access attempt for the first timing advance group. The reference downlink component carrier for the first timing advance group may be determined from a set of downlink component carriers with a similar delay due to downlink repeaters. The reference downlink component carrier for the first timing advance group may be determined from a set of downlink component carriers with a same carrier type where the carrier type includes at least a legacy carrier type or a new carrier type. The reference downlink component carrier for the first timing advance group may be determined from a set of downlink component carriers with a similar activity factor.

Other characteristics of a component carrier can be taken into account (e.g., whether it is equipped with a repeater, whether it is always on or periodically turned off, whether it is a new or legacy carrier type, etc.) in determining the reference downlink component carrier. A component carrier may be equipped with a repeater while another component carrier is not. In determining the reference downlink component carrier for a given timing advance group, the component carriers of the same or similar delay characteristics due to repeaters (either downlink repeaters, or uplink repeaters, or a combination thereof) may be determined to be possible candidates for the reference downlink component carrier for the given timing advance group. Different component carriers may have different activity factors. A component carrier may periodically be turned on and carries much less frequent downlink information compared with a regular carrier. It may then be preferable to avoid using this component carrier as the reference downlink component carrier. A component carrier may be of a legacy carrier type and another can be of a new carrier type. Carriers of the same type may be determined to be possible candidates for the reference downlink component carrier for a given timing advance group.

In some embodiments, multiple random access procedures may be performed in parallel with respect to two or more of the multiple timing advance groups, such as timing advance group 310-a and 310-b. Performing the multiple random access procedures may include performing a first random access procedure linked with the first timing advance group, such as timing advance group 310-b; and/or performing a second random access procedure linked with a second timing advance group, such as timing advance group 310-a, of the multiple timing advance groups, where one or more portions of the second random access procedure overlap with one or more portions of the first random access procedure.

Some embodiments include utilizing a non-contention based random access procedure on an uplink component carrier, such as UL-3, within the first timing advance group, such as timing advance group 310-a, through utilizing a downlink control channel transmitted on a downlink component carrier that is not linked with the uplink component carrier via a system information block broadcast (e.g., the primary component carrier (DL-1)). A cross-carrier indication field may be included in the downlink control channel to enable cross-carrier scheduling.

Some embodiments may provide advantages, for example, when the activation status of the SCCs changes from time to time. A timing advance group that contains SCCs, but no PCC, may face synchronization issues because of deactivation of the corresponding secondary cells. In contrast, a timing advance group with a primary cell that corresponds to a PCC may not face the same issues because the primary cell cannot be deactivated. Embodiments may also provide advantages over some other techniques that may be provide timing information for a timing advance group that include SCCs but no PCC, such as through SIB2 linkage. For example, when a secondary cell downlink component carrier is activated or deactivated, the SIB2 linked uplink component carrier is also generally activated or deactivated. As another example, the characteristics of a component carrier can be taken into account (activation status, whether it is equipped with a repeater, whether it is always on or periodically turned off, legacy or new carrier type, etc) in determining the reference downlink component carrier.

Figure 4A:
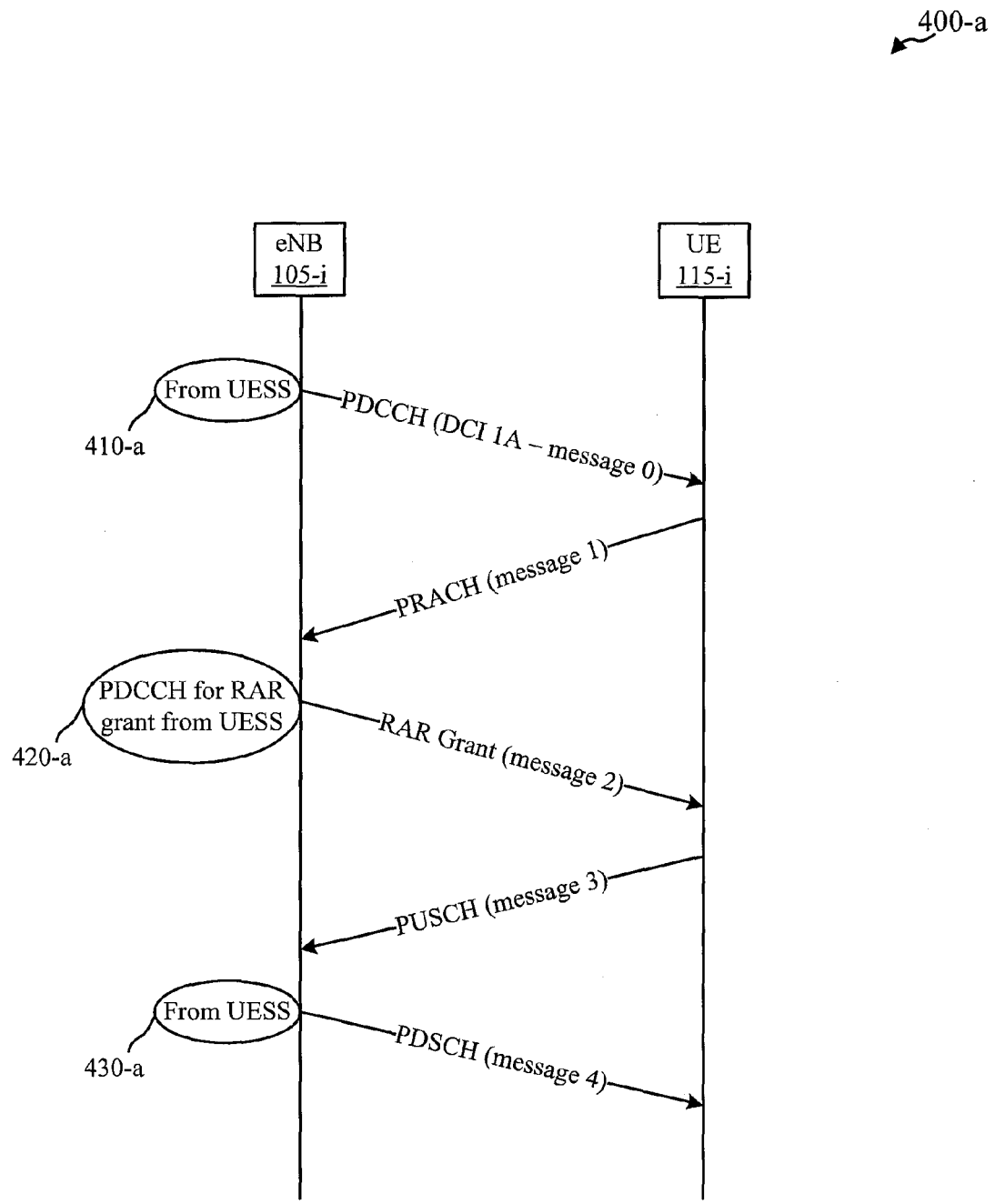
FIG. 4A illustrates an example of a random access procedure in accordance with various embodiments.
Figure 4B:
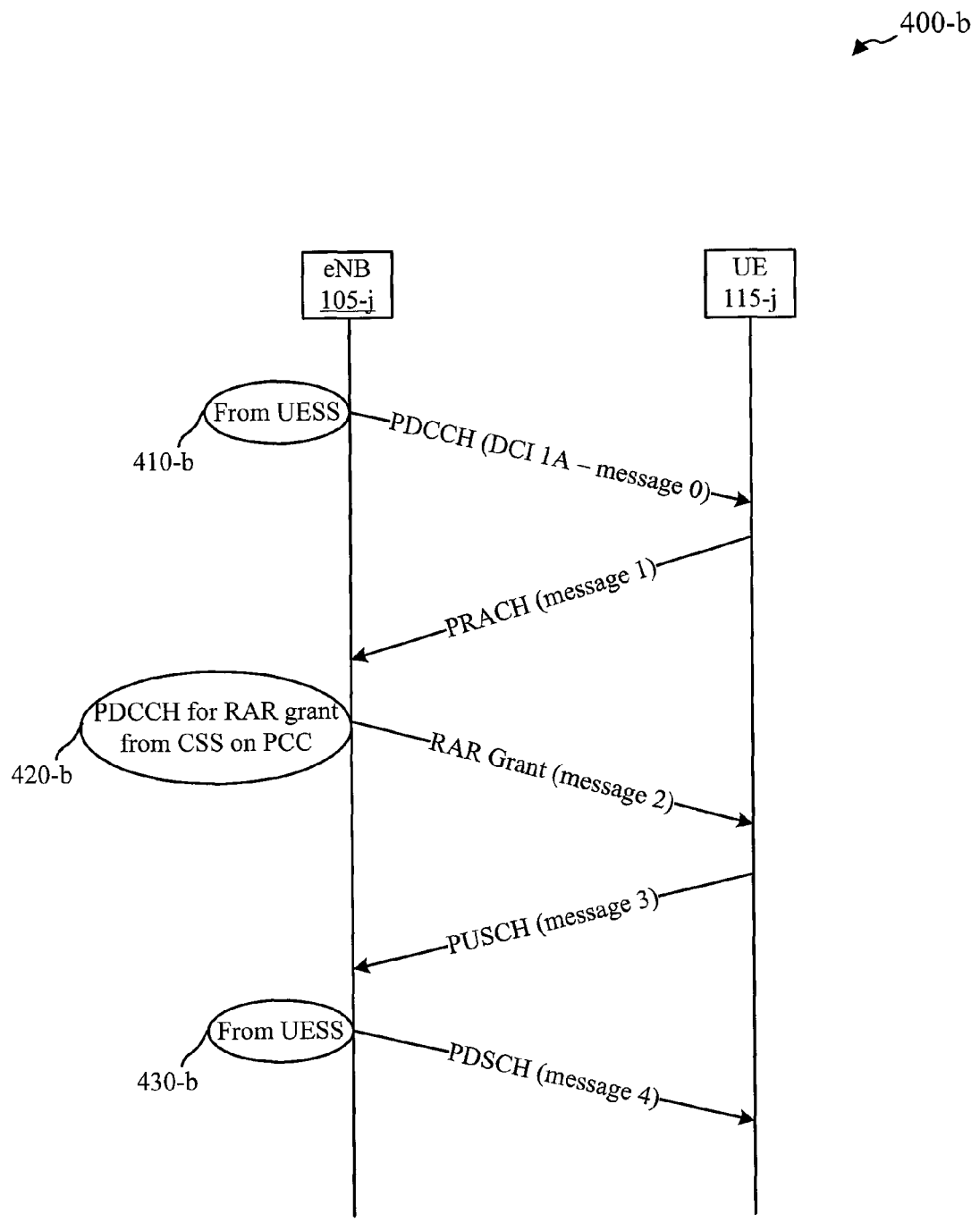
FIG. 4B illustrates an example of a random access procedure in accordance with various embodiments.
Figure 4C:
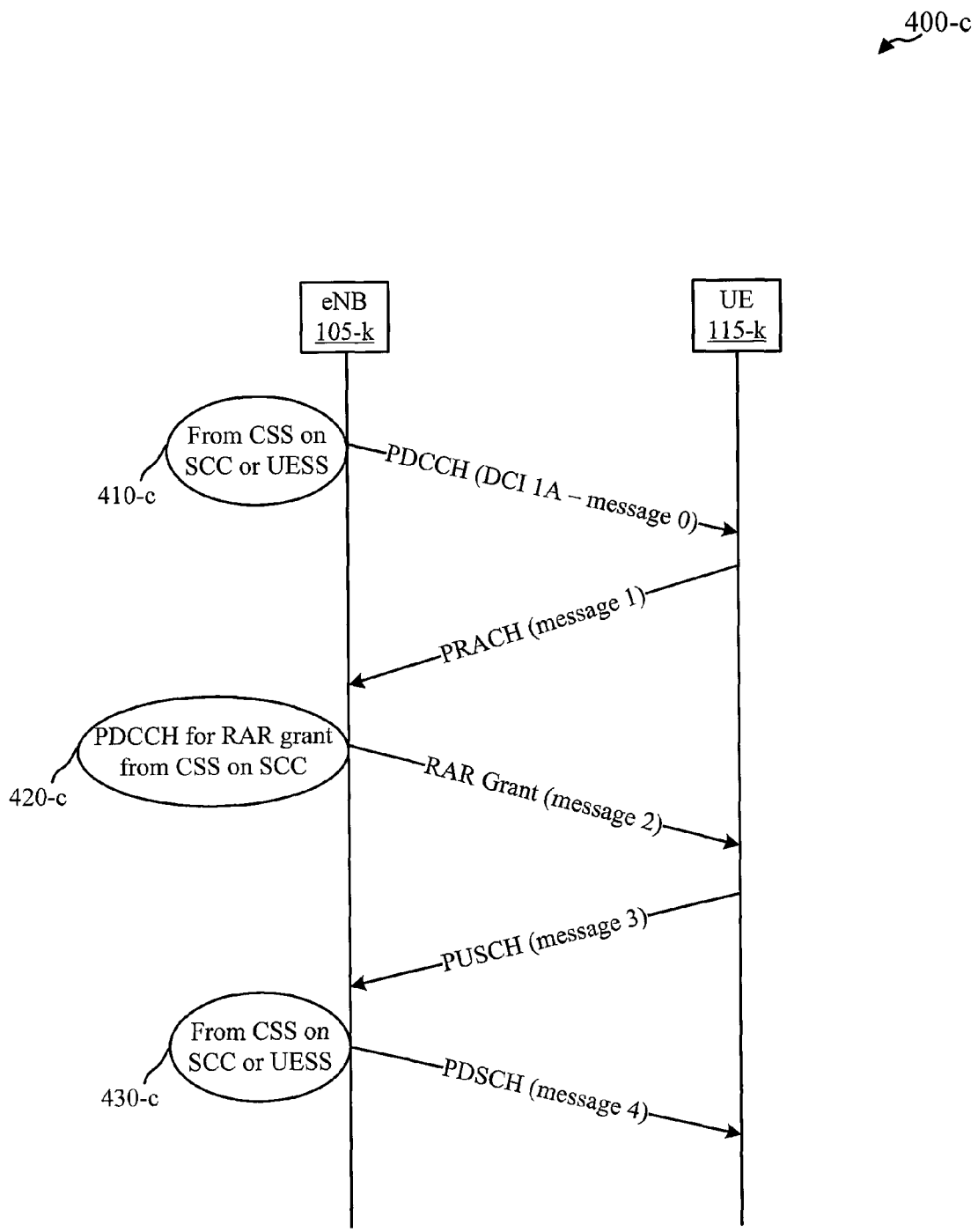
FIG. 4C illustrates an example of a random access procedure in accordance with various embodiments.

FIG. 4A, FIG. 4B, and/or FIG. 4C show examples of random access procedures 400-a, 400-b, and 400-c in accordance with various embodiments. These embodiments provide examples of search space designs that may be utilized with timing advance groups. In particular, these embodiments provide different ways to support random access for timing advance groups without primary component carriers.

Random access procedures 400-a, 400-b, and/or 400-c may include non-contention based random access. Some of these random access procedures may also be configured for contention-based random access, such as random access procedure 400-b and/or 400-c.

In general, a non-contention based random access procedure may be initiated for any of the procedures 400-a, 400-b, and/or 400-c utilizing Downlink Control Information (DCI). In one example of an LTE system, the various fields of DCI format 1A may be configured to initiate the random access procedure. As illustrated in the figures, eNB 105-i may transmit a DCI format 1A message to UE 115-j on a Physical Downlink Control Channel (PDCCH). The format 1A Cyclic Redundancy Check (CRC) may be scrambled with a Cell Radio-Network Temporary Identifier (C-RNTI). The remaining fields of the format 1A may be configured in the following manner: Localized/Distributed VRB assignment flag (1 bit is set to '0'); resource block assignment (all bits set to '1'); preamble index (6 bits); Physical Random Access Channel (PRACH) Mask Index (4 bits). The remaining bits in format 1A for compact scheduling assignment of the one Physical Downlink Shared Channel (PDSCH) codeword may be set to zero. Other embodiments may utilize other field settings. In addition, some embodiments may utilize other DCI formats.

In some embodiments, the PDCCH may be transmitted in UE-specific search space (UESS). For example, some embodiments may not allow PDCCH for downlink data arrival using format 1A to be transmitted from a common search space (CSS). The UESS can be on one SCC in a target timing advance group or any other component carrier when a carrier indicator field (CIF) is enabled.

Embodiments as shown in random access procedures 400 may provide different ways to handle a random access response (RAR) grant. In general, the RAR grant may include an uplink grant on PUSCH and timing information such as a timing advance command for controlling the amount of timing adjustment to be applied by the user equipment. Procedures 400 provide several different examples of search spaces for the accessing procedures. In particular, procedures 400 provide examples of how to send PDCCH for RAR grant (shown as message 2 in procedures 400).

Turning to FIG. 4A, random access procedure 400-a shows an example where a UE-specific search space may be utilized to send PDCCH for the RAR grant. Procedure 400-a shows PDCCH transmitted from eNB 105-i in UESS 410-a as DCI format 1A (message 0) to user equipment 115-i. User equipment 115-i may make a random access attempt by sending a random access preamble as PRACH (message 1) to eNB 105-i. In this example, PDCCH for RAR grant (message 2) may be sent from eNB 105-i in UESS 420-a. In some embodiments, this could be on the same SCC as message 0 or a different CC, depending on whether CIF is enabled for user equipment 115-i. Procedure 400-a also shows Physical Uplink Shared Channel (PUSCH) (message 3) and Physical Downlink Shared Channel (PDSCH) (message 4); these messages may involve transmitting signaling and/or user data between eNB 105-*i* and user equipment 115-*i*. The PDCCH scheduling the PDSCH may utilize UESS 430-*a* in some cases.

Some embodiments may utilize a Random Access Radio-Network Temporary Identifier (RA-RNTI) in the UESS for the user equipment 115-*i*. The number of PDCCH blind decodes may be increased in some cases, depending on whether the CSS DCI format or UESS DCI format is used as they have different sizes, and/or whether DCI format 1C is used. In some embodiments, only DCI format 1A may be utilized. In some cases, the DCI format 1A may confirm to the UESS format. This may result in the number of PDCCH blind decodes not increasing. Embodiments such as procedure 400-*a* may apply to non-contention based timing advance groups.

Turning to FIG. 4B, random access procedure 400-*b* shows an example where a CSS on a PCC may be utilized to send PDCCH for the RAR grant. Embodiments may be configured such that procedure 400-*b* may involve physical layer based handling and/or MAC layer based handling. Procedure 400-*b* shows PDCCH transmitted from eNB 105-*j* in UESS 410-*b* as DCI format 1A (message 0) to user equipment 115-*j*. User equipment 115-*j* may make a random access attempt by sending a random access preamble as PRACH (message 1) to eNB 105-*j*. In this example, PDCCH for RAR grant (message 2) may be sent from eNB 105-*j* from the common search space on the primary carrier component 420-*b*. Procedure 400-*b* also shows Physical Uplink Shared Channel (PUSCH) (message 3) subsequent to the RAR grant and a Physical Downlink Shared Channel (PDSCH) (message 4); these messages may involve transmitting signaling and/or user data between eNodeB 105-*j* and user equipment 115-*j*. The PDCCH scheduling the PDSCH may utilize UESS 430-*b* in some cases.

Some embodiments of procedure 400-*b* may utilize a physical layer based approach. For example, a carrier indicator field (CIF) may be enabled for some DCI in CSS. CIF may be added in DCI format 1A, for example, and may enable cross-carrier scheduling in the RAR grant. Additionally, or separately, CIF may be added in DCI format 1C. A combination these approaches, or splitting PDCCH decoding candidates may increase the number of decoding candidates in CSS. If it may be desirable to avoid increasing the number of PDCCH blind decodes, some embodiments may enable on the CIF for DCI format 1C and/or use it for message 2. In this case, there may be no cross-carrier RAR grant for DCI format 1A, but may be allowed only with DCI format 1C.

Some embodiments of procedure 400-*b* may utilize a MAC layer based approach. With a MAC layer based approach, a component carrier index and/or a timing advance group index may be utilized to enable a cross-carrier random access procedure. As an example, the component carrier index and/or timing advance group index may be introduced in message 0 particularly when CIF is configured for the UE. The signaling of the CC index and/or TA group index in this case can be done by re-interpreting some of the reserved bit(s) in DCI format 1A message 0. The CC index and/or the TA group index may also be included with the RAR in the MAC payload. The CC index and/or TA group index may be introduced to enable cross-carrier RAR management from the PCC to SCC. A CC index may be utilized to identify specific component carriers that may be utilized in the cross-carrier RAR. A TA group index may be utilized to identify different groups of component carriers or cells. TA group indexes are discussed in more detail below. In some cases, a timing advance group index may need the RRC to identify which component carrier to transmit PRACH and/or other messages in the RACH procedure within the timing advance group.

In one example of utilizing a TA group index with procedure 400-*b*, a contention-free random access procedure is initiated when eNB 105-*j* transmits a properly configured PDCCH message (message 0) to UE 115-*j*. The contention-free random access procedure may be used to establish a timing adjustment applicable to a group of secondary component carriers in a targeted TA group. For example, eNB 105-*j* may transmit the PDCCH message on an SCC in the targeted group. Alternatively or additionally, the PDCCH may include a TA group index corresponding to the group of SCCs.

When the PDCCH is received, the UE 115-*j* transmits message 1 on a physical random access channel (PRACH). The CC on which PRACH is transmitted may be identified by the TA group index included with PDCCH order initiating the random access procedure and/or it may be determined according to the SCC on which the PDCCH was received. The PRACH transmission may occur in a specified subframe and may include a predetermined preamble sequence. When eNB 105-*j* detects the PRACH transmission, it may generate a random access response message which, at the physical layer, may be referred to as an RAR grant (message 2). As shown, the PDCCH for the RAR may be transmitted in a common search defined for UE 115-*j* on its primary component carrier.

In this example, the RAR grant enables cross-carrier operation from PCC (on which the corresponding PDCCH is received) to an SCC in the target TA group. As noted previously, the PDSCH transmission corresponding to the PDCCH may carry an RAR message that includes a timing adjustment (TA) value and uplink grant. A MAC payload of the RAR message may also include a TA group index. Based on its TA group configuration, UE 115-*j* may identify the set of SCCs targeted for timing adjustment and a specific CC to use for completing the random access procedure. Thereafter, the UE 115-*j* may transmit PUSCH (message 3) on the CC in accordance with the grant included in the RAR message. As described herein, multiple TA groups may be configured for UE 115-*j*, including TA groups without PCC.

Turning to FIG. 4C, random access procedure 400-*c* shows an example where a common search space on a SCC may be utilized to send the PDCCH for RAR grant. Procedure 400-*c* shows PDCCH transmitted from eNodeB 105-*k* in UESS or CSS on SCC 410-*c* as DCI 1A message 0 to user equipment 115-*k*. User equipment 115-*k* may make a random access attempt by sending a random access preamble as PRACH message 1 to eNodeB 105-*k*. In this example, PDCCH for RAR grant message 2 may be sent from eNodeB 105-*k* from the common search space on the secondary carrier component 420-*c*. Procedure 400-*c* also shows Physical Uplink Shared Channel (PUSCH) message 3 and Physical Downlink Shared Channel (PDSCH) message 4; these messages may involve transmitting signaling and/or user data in general between eNodeB 105-*k* and user equipment 115-*k*. The PDCCH scheduling the PDSCH may utilize CSS on SCC and/or UESS 430-*c* in some cases.

Utilizing CSS on SCC for the user equipment 115-*k* may provide for other useful features so as group power control. Procedure 400-*c* may also be utilized for contention based SCC timing advance groups.

FIG. 5 shows one example of a table 500 that includes timing advance group indexing information in accordance with various embodiments. Different CCs or cells may be grouped into different timing advance groups. In this example, a primary cell, Pcell, and two secondary cells, Scell-1 and Scell-2, may be grouped together and identified by a TA group index, "0" in this case. A second group including two secondary cells, Scell-3 and Scell-4, may be grouped together and identified utilizing another TA group index, "1" in this case. In this example, a single bit of information may be utilized to identify each timing advance group, although different amounts of information may be used in different embodiments. This information may be configured for a user equipment 115 by a base station 105 and signaled to the UE 115 in one or RRC messages.

In some cases, the TA group index may generally indicate the timing advance group that includes a primary cell or PCC through a "0" index. Some embodiments may include timing advance indexes that may utilize additional bits to convey their information. The number of bits utilized may depend upon the number of timing advance groups. Thus, the use of two timing advance groups is provided merely as an example; other examples may include more than two timing advance groups and each group may include zero or more secondary cells or secondary component carriers. The number of timing advance groups with associated timing advance group indexes may depend upon a variety of factors including, but not limited, propagation delay characteristics, channel characteristics, user equipment device characteristics, and/or bandwidth characteristics of the component carriers.

The timing advance group index, such as seen in table 500, may be included in a MAC payload in some embodiments. The TA group index, such as seen in table 500, may be transmitted as part of a PDCCH payload in some embodiments. Some embodiments may utilize additional information such as a component carrier identifier as part of an RRC configuration to identify a component carrier within a timing advance group associated with a specific timing advance group index. The identified component carrier may be utilized for a random access attempt and/or other messages in the RACH procedure.

Figure 6:
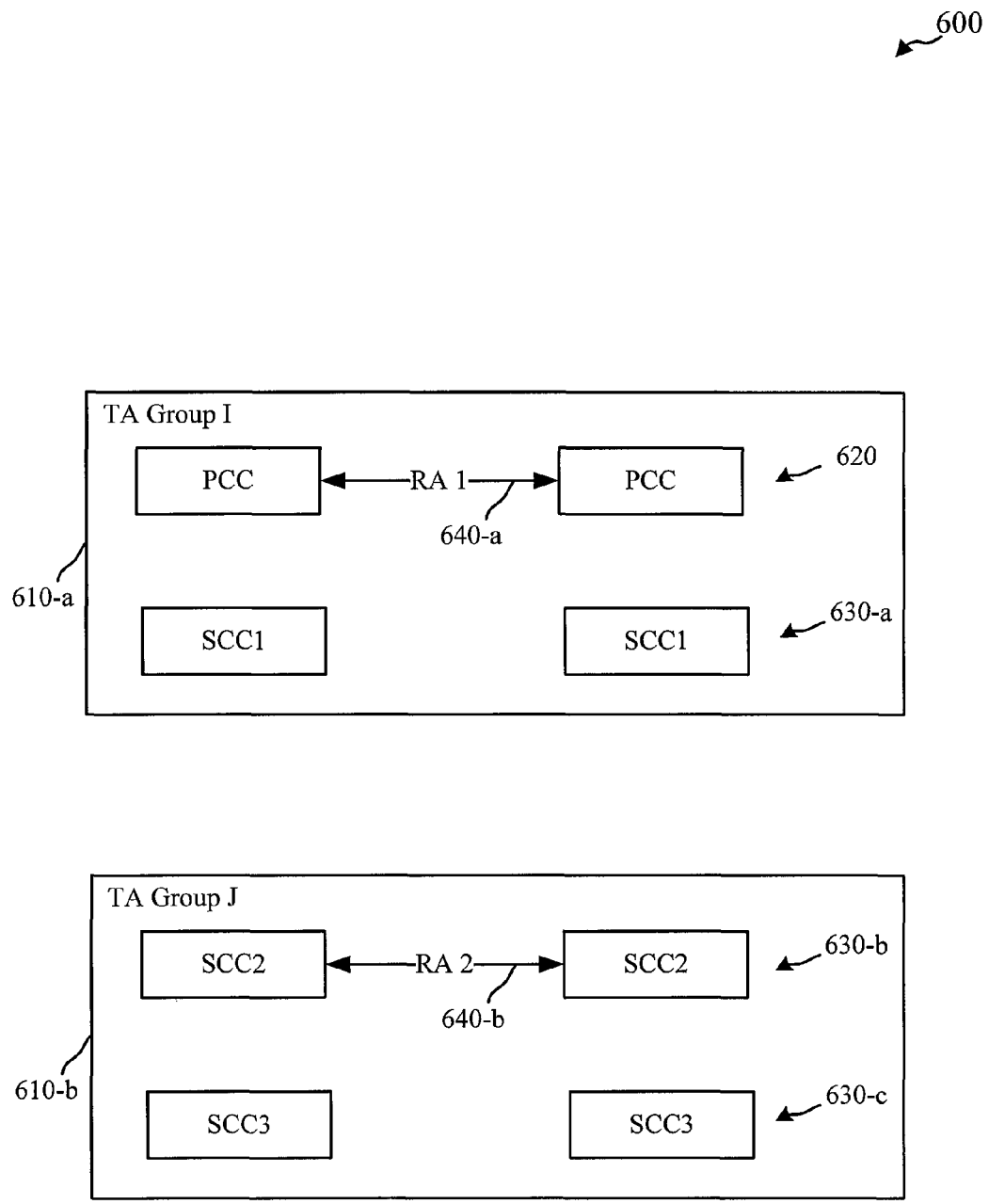
FIG. 6 is an example of parallel random access procedures in accordance with various embodiments.

FIG. 6 shows an exemplary configuration 600 of multiple timing advance groups that may utilize parallel random access procedures in accordance with various embodiments. The exemplary configuration 600 shows two timing advance groups, 610-a and 610-b. Timing advance group 610-a includes primary component carrier 620 and secondary component carrier 630-a. Timing advance group 610-b includes secondary component carrier 630-b and secondary component carrier 630-c. Other embodiments may include timing advance groups that include more or less component carriers. In this example, random access procedures 640-a for timing advance group 610-a may occur in parallel or overlap with random access procedures 640-b of timing advance group 610-b. As discussed in more detail below, different embodiments may handle these parallel random access procedures in a variety of ways.

Figure 7A:
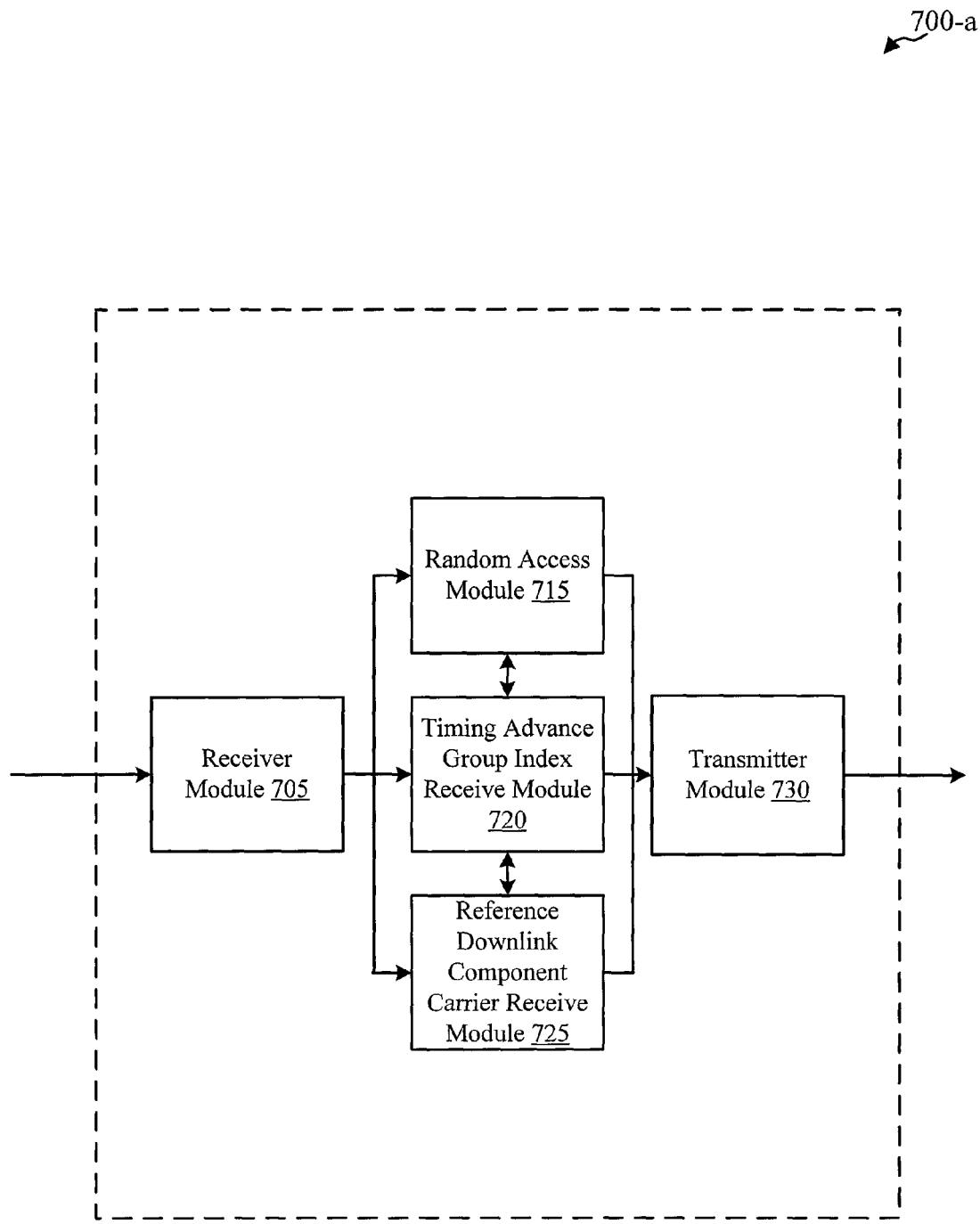
FIG. 7A is a block diagram illustrating a device that may provide support of multiple timing advance groups for user equipment in carrier aggregation in accordance with various embodiments.

Turning next to FIG. 7A, a block diagram illustrates a device 700-a that supports multiple timing advance groups for user equipment in carrier aggregation. In some embodiments, the device 700-a may be the user equipment 115 described with reference to FIG. 1, FIG. 2, FIG. 4A, FIG. 4B, 4C, FIG. 7B, and/or FIG. 9. The device 700-a may also be a processor. The device 700-a may include a receiver module 705, a random access module 715, a timing advance group index module 720, a reference downlink component carrier module 725, and/or a transmitter module 730. Each of these components may be in communication with each other.

These components of the device 700-a may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits.

In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 705 may receive information from difference sources over different channels and deliver to other modules of device 700-a. The transmitter module 730 may transmit information it may receive form the other modules of device 700-a.

The timing advance group index receive module 720 may provide a variety of cross-carrier management functions for multiple timing advance groups is provided. For example, the timing advance group index receive module 720 may receive a timing advance group index. The timing advance group index may identify a timing advance group from multiple timing advance groups. Each group may include different sets of component carriers. Some embodiments may include enabling cross-carrier random access procedure through the utilization of the timing advance group index.

In some embodiments, the TA group receive module 720 may receive a TA group index for a first timing advance group from the multiple timing advance groups that includes a PCC and a second timing advance group includes at least one SCC. The first timing advance group may also include one or more secondary component carriers, while the second timing advance group does not include the PCC. The timing advance group index receive module 720 may also work with timing advance groups that also include additional timing advance groups besides the first and second timing advance group.

In some embodiments, the TA group index module 720 may receive TA group indexes that include a single bit of information. A first configuration of the single bit of information may indicate that the timing advance group includes a primary component carrier; a second configuration of the single bit may indicate that the timing advance group one or more secondary component carriers without the primary component carrier. Some embodiments may include timing advance indexes that may utilize additional bits to convey their information. The number of bits that the timing advance group module 720 may utilize may depend upon the number of timing advance groups.

The TA group index may be received by receiver module 705 as part of a MAC payload in some embodiments. Some embodiments may also include receiving through the receiver module 705 a component carrier identifier as part of a Radio Resource Control (RRC) configuration to identify a component carrier within a timing advance group associated with a specific timing advance group index. The identified component carrier may be utilized from a random access procedure.

The random access module 715 may be utilized to perform multiple parallel random access procedures. For example, the random access module 715 may be utilized to perform a first random access procedure associated with a first timing advance group of component carriers. The random access module 715 may be utilized to perform a second random access procedure associated with a second timing advance group of component carriers where one or more portions of the second random access procedure overlap with one or more portions of the first random access procedure.

The random access module 715 may be utilized to perform power prioritization with respect to the first random access procedure and the second random access procedure. Performing the power prioritization may include performing an equal power scaling with respect to the first random access procedure and the second random access procedure. In some embodiments, performing the power prioritization may include transmitting a first random access attempt with respect to the first timing advance group of component carriers prior to transmitting a second random access attempt with respect to the second timing advance group of component carriers, where the first timing advance group of component carriers includes a primary component carrier.

The random access module 715 may be utilized to perform the first random access procedure that may include a non-contention based random access procedure and the second random access procedure may include a contention based random access procedure. Performing the power prioritization in this case may include transmitting a first random access attempt with respect to the first timing advance group of component carriers prior to transmitting a second random access attempt with respect to the second timing advance group of component carriers. These transmissions may utilize the transmitter module 730 also.

In some embodiments, performing the power prioritization may take into account some combination of the type of the group (primary or secondary), the type of the RACH procedure (contention-based or non-contention based), and/or simple equal power scaling. As an example, a primary group may be given the highest priority, followed by equal power scaling for all the remaining secondary groups if there are two or more secondary timing advance groups. As another example, a primary group may be given the highest priority, followed by equal power scaling for the secondary groups containing non-contention based RACH procedure, and finally, followed by equal power scaling for the secondary groups containing contention-based RACH procedure.

Some embodiments may include triggering an aperiodic channel quality indicator (A-CQI) using the random access module 715. In general, device 700-a and random access module 715 in particular may not expect to receive more than one aperiodic Channel-State Information (CSI) report request for a given subframe. If two or more parallel non-contention based RAR grant trigger PUSCH are received by the device 700-a at most one may have an A-CQI bit set. In some embodiments, parallel message 3 PUSCH may be utilized. For example, a component carrier 1 RAR grant in subframe n, with delay bit set to 1, may utilize a message 3 PUSCH in subframe n+7. A component carrier 2 RAR grant in subframe n+1, delay bit set to 0, may utilize a message 3 PUSCH in subframe n+7. As a result, parallel message 3 PUSCH in subframe n+7 may be utilized, but only one of the RAR grants may set A-CQI to 1. The PUSCH corresponding to the RAR grant with A-CQI set to 1 carries the A-CQI feedback.

The reference downlink component carrier receiver module 725 may be utilized to receive timing advance group synchronization information. For example, the reference downlink component carrier receiver module 725 may receive a reference downlink component carrier information. The reference downlink component carrier information may be utilized by device 700-a for timing adjustment within a first timing advance group from multiple timing advance groups. Each timing advance group may include at least one downlink component carrier.

Device 700-a may be configured for performing random access by a multi-carrier UE in some embodiments. A downlink control message configured to initiate a random access procedure may be received at receiver module 705 and passed to random access module 715. A response to the downlink control message may be generated at the random access module 715 and may be transmitted on a physical random access channel (PRACH) from transmitter module 730. An access grant may be received on a PCC of the user equipment at the receiver module 705. A set SCCs may be determined based on the random access grant. The timing advance group index receive module 720 and/or the random access module 715 may determine the set of secondary components. The random access procedure facilitated by the random access module 715 may be completed using a carrier in the set of SCCs to obtain TA information applicable to the set of SCCs.

The receiver module 705 and/or the random access module 715 may be configured to receive the downlink control message through detecting a physical downlink control channel (PDCCH) message in a UE-specific search space. The receiver module 705 and/or the random access module 715 may be configured to receive the random access grant through detecting a PDCCH message in a common search space of the PCC.

In some embodiments, device 700-a may be configured to obtain a medium access control (MAC) protocol data unit (PDU) with the random access grant. Using the timing advance group index receive module 702, a TA group index may be determined corresponding to the set of SCCs based on the MAC PDU. Some embodiments may further include configuring the timing advance group index receive module 720 to receive a configuration of TA groups corresponding to component carriers configured for the UE. The TA group index may be obtained from the MAC PDU. The configuration of TA groups may include at least a first TA group including the PCC, and a second TA group including the set of secondary CCs. In some embodiments, the timing advance group index receive module may be configured to determine TA group index corresponding to the set of SCCs as part of a PDCCH payload.

Some embodiments may further include utilizing the reference downlink component carrier receive module 725 to determine a reference downlink CC for completing the random access procedure based on the TA group index.

In some embodiments, the downlink control message may be configured to initiate the random access procedure comprises an identifier corresponding to the set of SCCs. The transmitter module 730 may transmit the response to the downlink control message to further include determining an SCC to transmit the PRACH based on the identifier.

In some embodiments, a second random access procedure may be initiated concurrently with the first random access procedure using the random access module 715.

Some embodiments may further include configuring the random access module 715 to determine a priority for allocating power between the first random access procedure and the second random access procedure. The random access module 715 may allocate power to the first random access procedure at a higher priority than the second random access procedure when the first random access procedure comprises a contention-free random access procedure and the second random access procedure comprises a contention-based random access procedure. The random access module 715 may allocate power to the second random access procedure at a higher priority than the first random access procedure when the second random access procedure when the second random access procedure is performed in relation to a group of carriers comprising a primary component carrier of the UE. The random access module 715 may determine the priority including performing an equal power scaling for each CC.

Figure 7B:
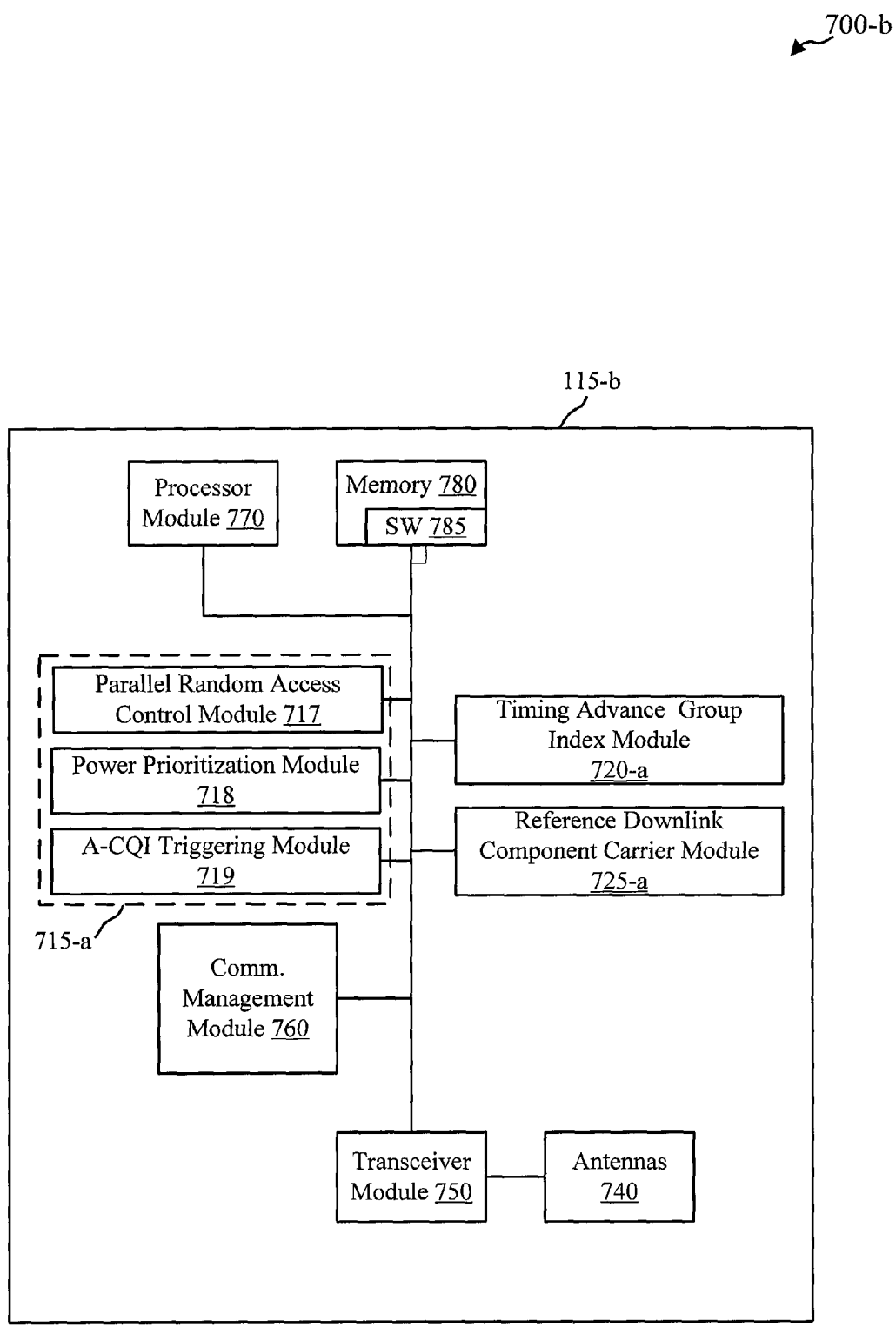
FIG. 7B is a block diagram illustrating a user equipment that may provide support of multiple timing advance groups for user equipment in carrier aggregation in accordance with various embodiments.

FIG. 7B is a block diagram 700-b of a user equipment 115-b in accordance with various embodiments. The user equipment 115-b may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-*b* may have an internal power supply (not shown), such as a small battery, to facilitate mobile operation. In some embodiments, the user equipment 115-*b* may be the user equipment 115 described with reference to FIG. 1, FIG. 2, FIG. 4A, FIG. 4B, 4C, FIG. 9, and/or device 700-*a* of FIG. 7A.

The user equipment 115-*b* may include antennas 740, a transceiver module 750, memory 780, and a processor module 770, which each may be in communication, directly or indirectly, with each other (e.g., via one or more buses). The transceiver module 750 is configured to communicate bi-directionally, via the antennas 740 and/or one or more wired or wireless links, with one or more networks, as described above. For example, the transceiver module 750 may be configured to communicate bi-directionally with base stations 105 of FIG. 1 or 2. The transceiver module 750 may include a modem configured to modulate the packets and provide the modulated packets to the antennas 740 for transmission, and to demodulate packets received from the antennas 740. While the user equipment 115-*b* may include a single antenna, the user equipment 115-*b* will typically include multiple antennas 740 for multiple links.

The memory 780 may include random access memory (RAM) and read-only memory (ROM). The memory 780 may store computer-readable, computer-executable software code 785 containing instructions that are configured to, when executed, cause the processor module 770 to perform various functions described herein (e.g., call processing, database management, message routing, etc.). Alternatively, the software 785 may not be directly executable by the processor module 770 but be configured to cause the computer (e.g., when compiled and executed) to perform functions described herein.

The processor module 770 may include an intelligent hardware device, e.g., a central processing unit (CPU) such as those made by Intel® Corporation or AMD®, a microcontroller, an application specific integrated circuit (ASIC), etc. The processor module 770 may include a speech encoder (not shown) configured to receive audio via a microphone, convert the audio into packets (e.g., 30 ms in length) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking.

According to the architecture of FIG. 7B, the user equipment 115-*b* may further include a communications management module 760. The communications management module 760 may manage communications with other user equipment 115. By way of example, the communications management module 760 may be a component of the user equipment 115-*b* in communication with some or all of the other components of the user equipment 115-*b* via a bus. Alternatively, functionality of the communications management module 760 may be implemented as a component of the transceiver module 750, as a computer program product, and/or as one or more controller elements of the processor module 770.

The components for user equipment 115-*b* may be configured to implement aspects discussed above with respect to device 700-*a* in FIG. 7A and may not be repeated here for the sake of brevity. For example, the timing advance group index receive module 720-*a* may be an example of the timing advance group index receive module 720 of FIG. 7A. The reference downlink component carrier receive module 725-*a* may be an example of the reference downlink component carrier receive module 725 of FIG. 7A. Parallel random access control module 717, power prioritization module 718, and/or A-CQI triggering module 719 may provide specific functionality individually or in combination for a random access module 715-*a* that may be an example of the random access module 715 of FIG. 7A.

Figure 8A:
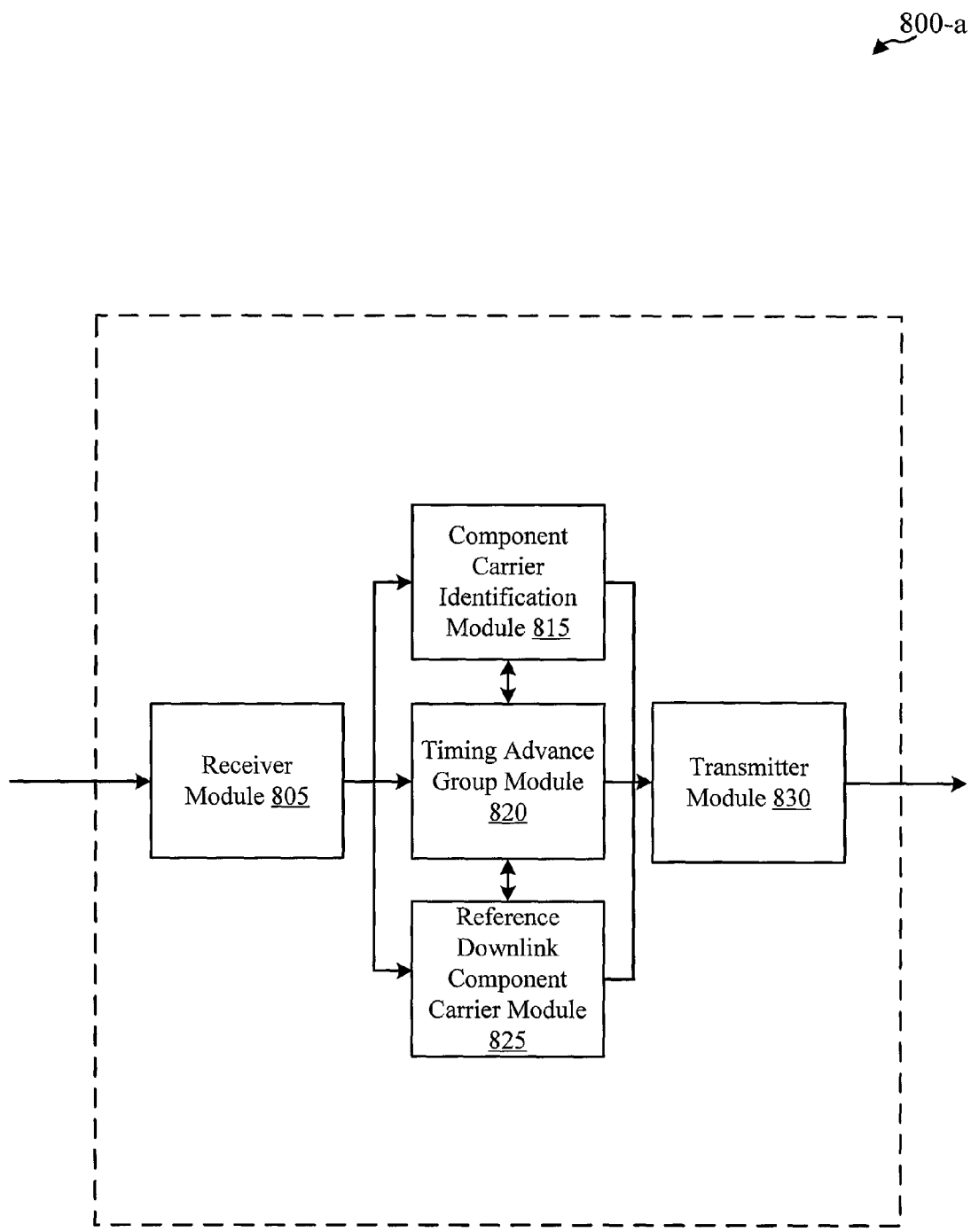
FIG. 8A is a block diagram illustrating a device that may provide support of multiple timing advance groups for user equipment in carrier aggregation in accordance with various embodiments.

Turning next to FIG. 8A, a block diagram illustrates a device 800-*a* that supports multiple timing advance groups for user equipment in carrier aggregation. In some embodiments, the device 800-*a* may be the user equipment 115 described with reference to FIG. 1, FIG. 2, FIG. 4A, FIG. 4B, 4C, FIG. 7B, and/or FIG. 9; and/or device 700-*a* of FIG. 7. The device 800-*a* may also be a processor. The device 800-*a* may include a receiver module 805, a component carrier identification module 815, a timing advance group module 820, a reference downlink component carrier module 825, and/or a transmitter module 830. Each of these components may be in communication with each other. Device 800-*a* may be configured as one or more processors.

These components of the device 800-*a* may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 805 may receive information from difference sources over different channels and deliver to other modules of device 800-*a*. The transmitter module 830 may transmit information it may receive form the other modules of device 800-*a*.

The component carrier identification module 815 may identify multiple component carriers as part of a carrier aggregation operation. The multiple component carriers may include one or more downlink component carriers and two or more uplink component carriers. The timing advance group module 820 may determine multiple timing advance groups. Each component carrier in the multiple component carriers may be included in one of the timing advance groups. The timing advance group module 820 may identify a first timing advance group from the multiple timing advance group. The reference downlink component carrier module 825 may determine a reference downlink component carrier for the first timing advance group based at least in part on a Radio Resource Control (RRC) configuration. The timing advance group module 820, the reference downlink component carrier module 825, and/or other components of device 800-*a* may utilize the determined reference downlink component for timing adjustment within at least the first timing advance group.

In some embodiments, device 800-*a* may receive indication of a primary downlink component carrier through the RRC configuration, such as through receiver 805. The primary downlink component carrier may be the determined reference downlink component carrier.

Some embodiments of device 800-*a*, through the timing advance group module 820, the reference downlink component carrier module 825, and/or other components of device 800-*a*, include utilizing the primary downlink component carrier for timing adjustment within a second timing advance group from the multiple timing advance groups. The primary downlink component carrier may be included in the second timing advance group.

In some embodiments, the timing advance group module 820 may include one or more downlink component carriers of the one or more identified downlink carriers in the first timing advance group. The reference downlink component carrier module 825 may determine the reference downlink component carrier based on an RRC configuration for the one or more downlink component carriers in the first timing advance group. The reference downlink component carrier module 825 may determine the reference downlink component carrier for the first timing advance group to be a downlink component carrier with a smallest cell index from multiple cell indices configured for each one of the one or more downlink component carriers in the first timing advance group.

The reference downlink component carrier may be determined by the reference downlink component carrier module 825 from a set of activated downlink component carriers. In some cases, the component carrier identification module 815 may determine that the one or more downlink component carriers and the two or more uplink component carriers are associated with two or more bands. The reference downlink component carrier for the first timing advance group may be determined by the reference downlink component carrier module 825 or the timing advance group module 820 from a set of downlink component carriers of the same or similar band. As an example, the reference downlink component carrier may be determined to be a downlink component carrier of the same or similar band as an uplink component carrier associated with a random access attempt for the first timing advance group. The reference downlink component carrier for the first timing advance group may be determined by the reference downlink component carrier module 825 from a set of downlink component carriers with a similar delay due to downlink repeaters. The reference downlink component carrier for the first timing advance group may be determined by the reference downlink component carrier module 825 from a set of downlink component carriers with a same carrier type where the carrier type includes at least a legacy carrier type or a new carrier type. The reference downlink component carrier for the first timing advance group may be determined by the reference downlink component carrier module 825 from a set of downlink component carriers with a similar activity factor.

Device 800-a, through component carrier identification module 815, timing advance group module 820, or reference downlink component carrier module 825, may take into account different characteristics of a component carrier (e.g., whether it is equipped with a repeater, whether it is always on or periodically turned off, whether it is a new or legacy carrier type, etc.) in determining the reference downlink component carrier. A component carrier may be equipped with a repeater while another component carrier is not. In determining the reference downlink component carrier for a given timing advance group, the component carriers of the same or similar delay characteristics due to repeaters (either downlink repeaters, or uplink repeaters, or a combination thereof) may be determined to be possible candidates for the reference downlink component carrier for the given timing advance group. Different component carriers may have different activity factors. A component carrier may periodically be turned on and carries much less frequent downlink information compared with a regular carrier. It may then be preferable to avoid using this component carrier as the reference downlink component carrier. A component carrier may be of a legacy carrier type and another can be of a new carrier type. Carriers of the same type may be determined to be possible candidates for the reference downlink component carrier for a given timing advance group.

Some embodiments of device 800-a may be configured for performing multiple random access procedures in parallel with respect to two or more of the multiple timing advance groups. Performing the multiple random access procedures may include performing a first random access procedure linked with the first timing advance group; and/or performing a second random access procedure linked with a second timing advance group of the multiple timing advance groups, where one or more portions of the second random access procedure overlap with one or more portions of the first random access procedure.

Some embodiments of device 800-a may be configured for initiating a non-contention based random access procedure on an uplink component carrier within the first timing advance group through utilizing a downlink control channel transmitted on a downlink component carrier that is not linked with the uplink component carrier via a system information block broadcast (e.g., the primary component carrier). A cross-carrier indication field may be included in the downlink control channel to enable cross-carrier scheduling.

Figure 8B:
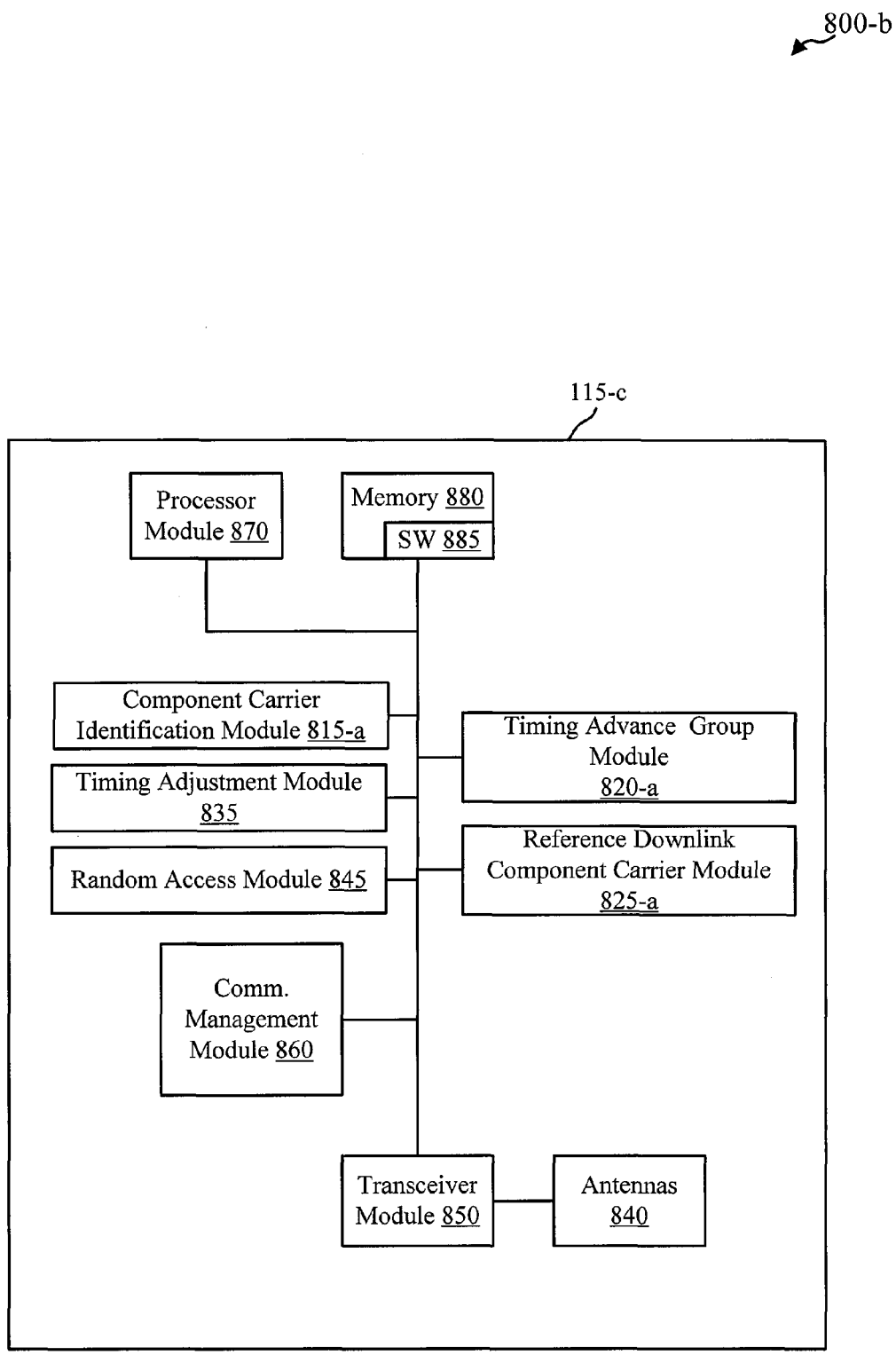
FIG. 8B is a block diagram illustrating a user equipment that may provide support of multiple timing advance groups for user equipment in carrier aggregation in accordance with various embodiments.

FIG. 8B is a block diagram 800-b of a user equipment 115-c in accordance with various embodiments. The user equipment 115-c may have any of various configurations, such as personal computers (e.g., laptop computers, netbook computers, tablet computers, etc.), cellular telephones, PDAs, digital video recorders (DVRs), interne appliances, gaming consoles, e-readers, etc. The user equipment 115-c may have an internal power supply (not shown), such as a small battery, to facilitate mobile operation. In some embodiments, the user equipment 115-c may be the user equipment 115 described with reference to FIG. 1, FIG. 2, FIG. 4A, FIG. 4B, 4C, FIG. 7B, FIG. 9, and/or device 700-a of FIG. 7A and/or device 800-a of FIG. 8A The user equipment 115-c may include antennas 840, a transceiver module 850, memory 880, and a processor module 870, which each may be in communication, directly or indirectly, with each other (e.g., via one or more buses). The transceiver module 850 is configured to communicate bi-directionally, via the antennas 840 and/or one or more wired or wireless links, with one or more networks, as described above. For example, the transceiver module 850 may be configured to communicate bi-directionally with base stations 105 of FIG. 1 or 2. The transceiver module 850 may include a modem configured to modulate the packets and provide the modulated packets to the antennas 840 for transmission, and to demodulate packets received from the antennas 840. While the user equipment 115-c may include a single antenna, the user equipment 115-c will typically include multiple antennas 840 for multiple links.

The memory 880 may include random access memory (RAM) and read-only memory (ROM). The memory 880 may store computer-readable, computer-executable software code 885 containing instructions that are configured to, when executed, cause the processor module 870 to perform various functions described herein (e.g., call processing, database management, message routing, etc.). Alternatively, the software 885 may not be directly executable by the processor module 870 but be configured to cause the computer (e.g., when compiled and executed) to perform functions described herein.

The processor module 870 may include an intelligent hardware device, e.g., a central processing unit (CPU) such as those made by Intel® Corporation or AMD®, a microcontroller, an application specific integrated circuit (ASIC), etc. The processor module 870 may include a speech encoder (not shown) configured to receive audio via a microphone, convert the audio into packets (e.g., 30 ms in length) representative of the received audio, provide the audio packets to the transceiver module 850, and provide indications of whether a user is speaking. Alternatively, an encoder may only provide packets to the transceiver module 850, with the provision or withholding/suppression of the packet itself providing the indication of whether a user is speaking.

According to the architecture of FIG. 8B, the user equipment 115-*c* may further include a communications management module 860. The communications management module 860 may manage communications with other user equipment 115. By way of example, the communications management module 860 may be a component of the user equipment 115-*c* in communication with some or all of the other components of the user equipment 115-*c* via a bus. Alternatively, functionality of the communications management module 860 may be implemented as a component of the transceiver module 850, as a computer program product, and/or as one or more controller elements of the processor module 870.

The components for user equipment 115-*c* may be configured to implement aspects discussed above with respect to device 800-*a* in FIG. 8A and may not be repeated here for the sake of brevity. For example, the timing advance group module 820-*a* may be an example of the timing advance group index module 820 of FIG. 8A. The reference downlink component carrier module 825-*a* may be an example of the reference downlink component carrier module 825 of FIG. 8A. The component carrier identification module 815-*a* may be an example of the component carrier identification module 815 of FIG. 8A. User equipment 115-*c* may also include a timing adjustment module 835, whose function has been described above with respect to device 800-*a*. User equipment 115-*c* may also include a random access module 845, whose functions have been described above with respect to device 800-*a*.

Figure 9A:
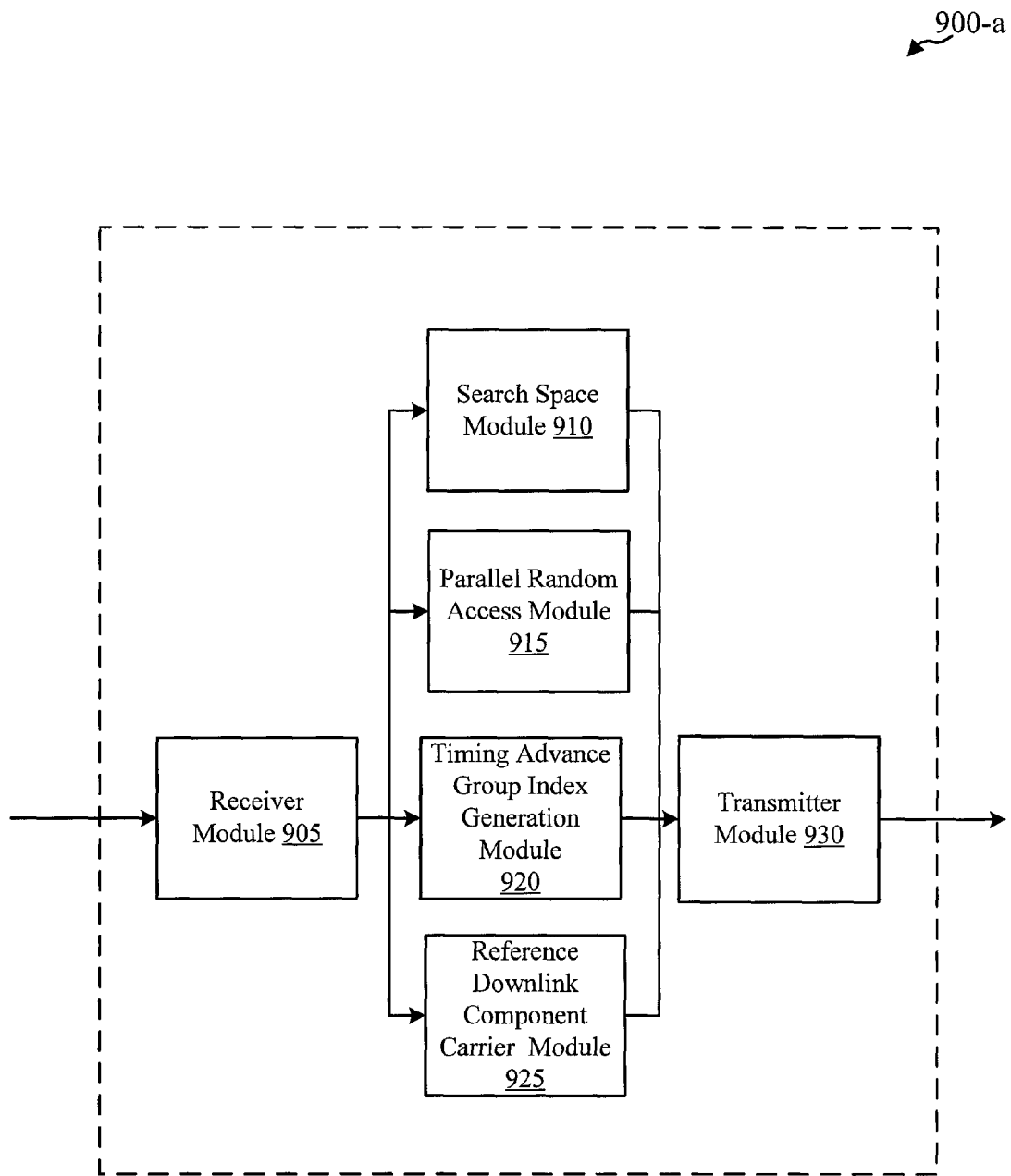
FIG. 9A is a block diagram illustrating a device that may provide support of multiple timing advance groups for user equipment in carrier aggregation in accordance with various embodiments.

Turning next to FIG. 9A, a block diagram illustrates a device 900-*a* that supports multiple timing advance groups for user equipment in carrier aggregation. In some embodiments, the device 900-*a* may be the base station 105 described with reference to FIG. 1, FIG. 2, FIG. 4A, FIG. 4B, 4C, and/or FIG. 9B. The device 900-*a* may also be a processor.

The device 900-*a* may include a receiver module 905, a search space module 910, a parallel random access module 915, a timing advance group index generation module 920, a reference downlink component carrier module 925, and/or a transmitter module 930. Each of these components may be in communication with each other.

These components of the device 900-*a* may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 905 may receive information from difference sources over different channels and deliver to other modules of device 900-*a*. The transmitter module 930 may transmit information it may receive form the other modules of device 900-*a*.

Search space module 910 may be utilized to support random access procedures for timing advance groups without a primary component carrier. Search space module 910 may be utilized to generate different search spaces. Some embodiments may utilize a UE-specific search space. Other embodiments may utilize a common search space on the primary component carrier. Additional embodiments may utilize a common search space on a secondary component carrier. Some embodiments may utilize non-contention based random access procedures, while other embodiments may utilize contention based random access procedures.

The timing advance group index generation module 920 may provide a variety of cross-carrier management functions for multiple timing advance groups is provided. For example, the timing advance group index generation module 920 may generate a timing advance group index. The timing advance group index may identify a timing advance group from multiple timing advance groups. Each group may include different sets of component carriers. The timing advance group index generation module 920 may send the generated timing advance group index to the transmitter module 930, from where the timing advance group index may be transmitted as part of a random access response. Some embodiments may include enabling cross-carrier random access procedure management through the utilization of the timing advance group index.

In some embodiments, the timing advance index generation group module 920 may generate a timing advance group index for a first timing advance group from the multiple timing advance groups that includes a primary component carrier and a second timing advance group includes at least one secondary component carrier. The first timing advance group may also include one or more secondary component carriers, while the second timing advance group does not include a primary component carrier. The timing advance group index generation module 920 may also work with timing advance groups that also include additional timing advance groups besides the first and second timing advance group. The number of timing advance groups associated with timing advance group indexes generated by the timing advance group index generation module 920 may depend upon a variety of factors including, but not limited to, propagation delay characteristics, channel characteristics, user equipment device characteristics, and/or bandwidth characteristics of the component carriers.

In some embodiments, the timing advance group index generation module 920 may generate timing advance group indexes that utilizes a single bit of information. The transmitter module 930 may transmit these timing advance group indexes as a single bit of information. A first bit configuration of the single bit of information may indicate that the timing advance group includes a primary component carrier; a second bit configuration of the single bit may indicate that the timing advance group one or more secondary component carriers without the primary component carrier. Some embodiments may include timing advance indexes that may utilize additional bits to convey their information. The number of bits that the timing advance group module 920 may utilize may depend upon the number of timing advance groups.

The timing advance group index may be transmitted by the transmitter module 930 as part of a MAC payload in some embodiments. Some embodiments may also include transmitting through the transmitter module 930 a component carrier identifier as part of a Radio Resource Control (RRC) configuration to identify a component carrier within a timing advance group associated with a specific timing advance group index. The identified component carrier may be utilized for a random access response.

The parallel random access module 915 may be utilized to perform multiple parallel random access procedures. For example, the parallel random access module 915 may be utilized to perform a first random access procedure associated with a first timing advance group of component carriers. The parallel random access module 915 may be utilized to perform a second random access procedure associated with a second timing advance group of component carriers where one or more portions of the second random access procedure overlap with one or more portions of the first random access procedure.

In some embodiments, the parallel random access module 915 may configure a first subframe that includes a first random access response as part of the first random access procedure. A second subframe including a second random access response may be configured by the parallel random access module 915 as part of the second random access procedure. The first subframe and the second subframe may be transmitted from the parallel random access module 915 through the transmitter module 930. As a result, the first and second random access responses may not be transmitted in the same subframe.

The reference downlink component carrier module 925 may be utilized to provide timing advance group synchronization information. For example, the reference downlink component carrier module 925 may determine a reference downlink component carrier. Reference downlink component carrier information may be transmitted from transmitter 930 to a user equipment 115 where it may be utilized for timing adjustment within a first timing advance group from multiple timing advance groups. Each timing advance group may include at least one downlink component carrier.

In some embodiments, the reference downlink component carrier module 925 may determine the reference downlink component carrier such that a second timing advance group includes a primary component carrier. In some embodiments, the reference downlink component carrier module 925 may determine the reference downlink component carrier utilizing a downlink component carrier linked with an uplink component carrier associated with a random access attempt to determine the reference downlink component carrier. The downlink component carrier may be linked with the uplink component carrier through a SIB2 linkage.

In some embodiments, the reference downlink component carrier module 925 may determine the reference downlink component carrier based on a Radio Resource Control (RRC) configuration of the user equipment. For example, as previously described for carrier aggregation, device 900-a may send RRC configuration message(s) to a user equipment 115 identifying one carrier as the PCC and additional carriers as SCCs. The carrier that is identified as PCC may serve as the reference downlink carrier for one or more timing advance groups. This arrangement is illustrated in FIG. 3B in which the RRC-configured PCC (DL-1) for a user equipment 115 serves as the reference carrier for component carriers in each of the two timing advance groups 310-a, 310-b. This RRC-based approach may be advantageous when the activation status of the SCCs (DL-2, DL-3) changes from time to time.

Device 900-a may be configured for performing random access by a base station in some embodiments. Transmitter module 930 and/or search space module 910 may generate and/or transmit a downlink control message configured to initiate a random access procedure may be transmitted. Receiver module 905 may receive a response to the downlink control message on a physical random access channel (PRACH). Transmitter module 930 and/or search space module 910 may generate and/or transmit an access grant on a primary component carrier (PCC) of a user equipment, wherein the access grant includes information regarding a set of secondary component carriers (SCCs). Transmitter module 930, timing advance group index generation module 920, and/or reference downlink component carrier module 925 may generate and/or transmit timing advance (TA) information applicable to the set of SCCs to complete the random access procedure using a carrier in the set of SCCs.

Transmitting the downlink control message may include transmitting a physical downlink control channel (PDCCH) message in a UE-specific search space. Transmitting the random access grant may include transmitting a PDCCH message in a common search space of the PCC.

In some embodiments, transmitter module 930 and/or search space module 910 may further generate and/or transmit a medium access control (MAC) protocol data unit (PDU) with the random access grant. Transmitter module 930 and/or timing advance group index generation module 920 may generate and/or transmit a timing advance (TA) group index corresponding to the set of SCCs with the random access grant. A configuration of TA groups corresponding to component carriers configured for the UE may be transmitted in some embodiments. The TA group index may be transmitted as part of the MAC PDU. The configuration of TA groups may include at least a first TA group including the PCC, and a second TA group including the set of secondary CCs. Transmitter module 930 and/or reference downlink component carrier module 925 may generate and/or transmit a reference downlink CC for completing the random access procedure based on the TA group index.

In some embodiments, the transmitter module 930 and/or the timing advance group index generation module 920 may generate and/or transmit a timing advance (TA) group index corresponding to the set of SCCs as part of a PDCCH payload. In some embodiments, the downlink control message configured to initiate the random access procedure may include an identifier corresponding to the set of SCCs that may be generated and/or transmitted by the transmitter module 930 and/or search space module 910. Receiving the response to the downlink control message at the receiver module 905 may further include receiving the PRACH on an SCC based on the identifier.

Figure 9B:
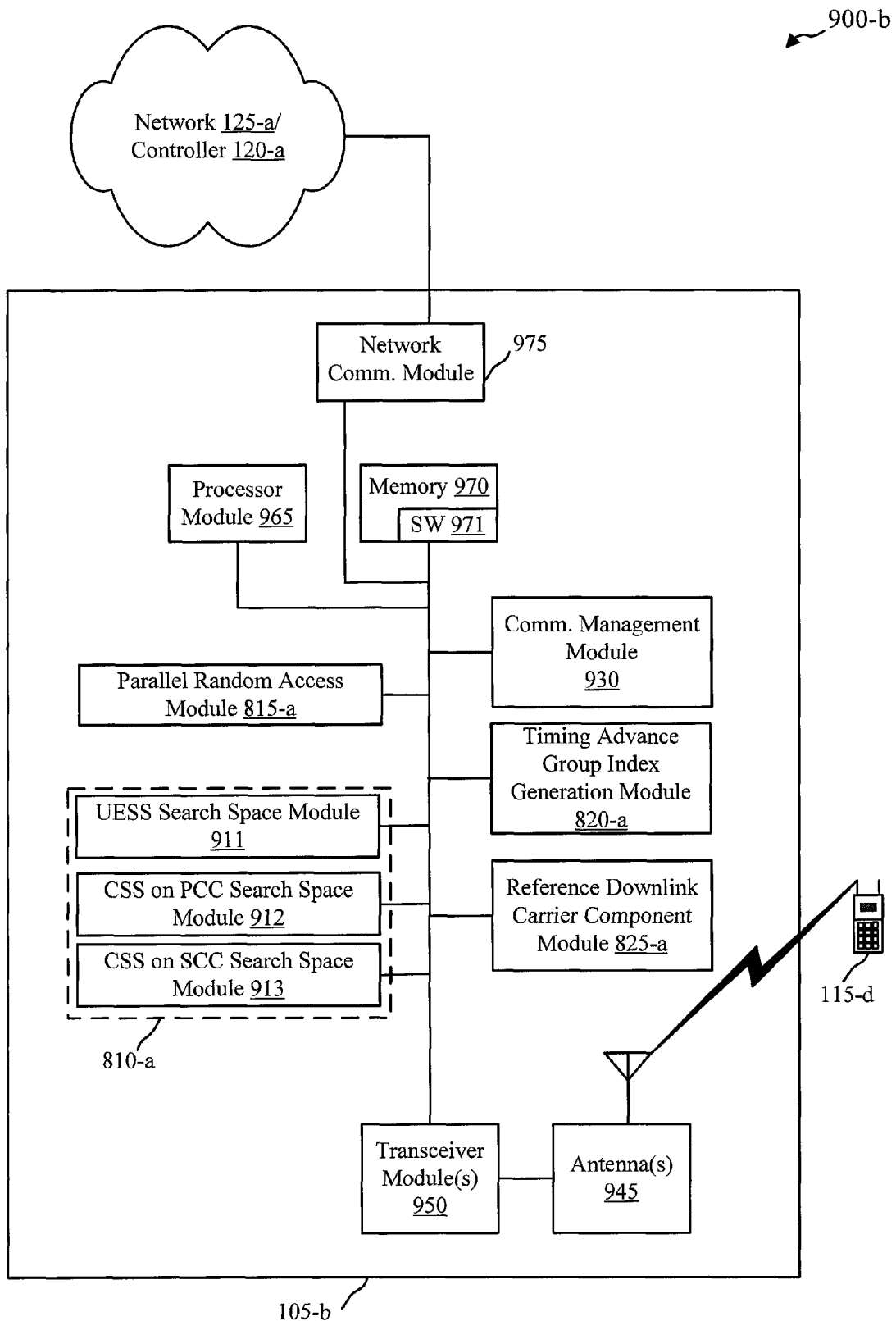
FIG. 9B is a block diagram illustrating a communications system that may be configured to support multiple timing advance groups for user equipment in carrier aggregation in accordance with various embodiments.

FIG. 9B shows a block diagram of a communications system 900-b that may be configured to support multiple timing advancing groups for user equipment. This system 900-b may be an example of aspects of the system 100 depicted in FIG. 1 and/or system 200 of FIG. 2 and/or device 900-a of FIG. 9A, for example. The base station 105-b may include antennas 945, a transceiver module 950, memory 970, and a processor module 965, which each may be in communication, directly or indirectly, with each other (e.g., over one or more buses). The transceiver module 950 may be configured to communicate bi-directionally, via the antennas 945, with the user equipment 115-d. The transceiver module 950 (and/or other components of the base station 105-b) may also be configured to communicate bi-directionally with one or more networks. In some cases, the base station 105-b may communicate with the network 125-a and/or controller 120-a through network communications module 975. Base station 105-b may be an example of a eNodeB base station, a Home eNodeB base station, a NodeB base station, and/or a Home NodeB base station.

The memory 970 may include random access memory (RAM) and read-only memory (ROM). The memory 970 may also store computer-readable, computer-executable software code 971 containing instructions that are configured to, when executed, cause the processor module 965 to perform various functions described herein (e.g., call processing, database management, message routing, etc.). Alternatively, the software 971 may not be directly executable by the processor module 965 but be configured to cause the computer, e.g., when compiled and executed, to perform functions described herein.

The processor module 965 may include an intelligent hardware device, e.g., a central processing unit (CPU) such as those made by Intel® Corporation or AMD®, a microcontroller, an application specific integrated circuit (ASIC), etc. The processor module 965 may include a speech encoder (not shown) configured to receive audio via a microphone, convert the audio into packets (e.g., 30 ms in length) representative of the received audio, provide the audio packets to the transceiver module 950, and provide indications of whether a user is speaking. Alternatively, an encoder may only provide packets to the transceiver module 950, with the provision or withholding/suppression of the packet itself providing the indication of whether a user is speaking.

The transceiver module 950 may include a modem configured to modulate the packets and provide the modulated packets to the antennas 945 for transmission, and to demodulate packets received from the antennas 945. While some examples of the base station 105-*b* may include a single antenna 945, the base station 105-*b* preferably includes multiple antennas 945 for multiple links which may support carrier aggregation. For example, one or more links may be used to support macro communications with user equipment 115-*d*.

According to the architecture of FIG. 9B, the base station 105-*b* may further include a communications management module 930. The communications management module 930 may manage communications with other base station 105. By way of example, the communications management module 930 may be a component of the base station 105-*b* in communication with some or all of the other components of the base station 105-*b* via a bus. Alternatively, functionality of the communications management module 930 may be implemented as a component of the transceiver module 950, as a computer program product, and/or as one or more controller elements of the processor module 965.

The components for user equipment base station 105-*b* may be configured to implement aspects discussed above with respect to device 900-*a* in FIG. 9A and may not be repeated here for the sake of brevity. For example, the timing advance group index generation module 920-*a* may be an example of the timing advance group index module 920 of FIG. 9. The reference downlink component carrier module 925-*a* may be an example of the reference downlink component carrier module 925 of FIG. 9. Parallel random access module 915-*a* may be an example of the parallel random access module 915 of FIG. 9. UESS search space module 911, CSS on PCC search space module 912, and/or CSS on SCC search space module 913 may provide specific functionality individually or in combination for a search space module 910-*a* that may be an example of search space module 910 of FIG. 9.

Figure 10A:
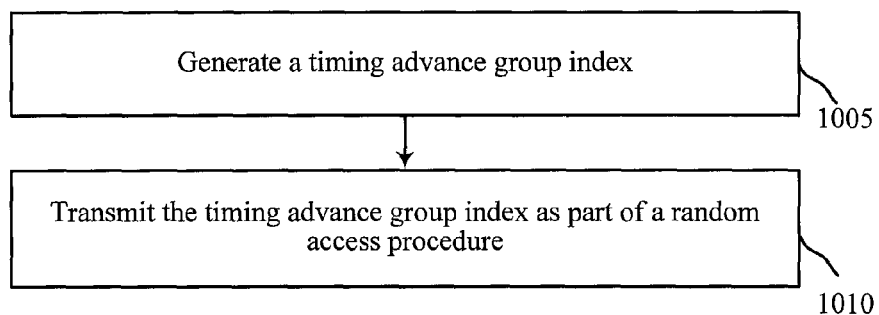
FIG. 10A is a flow diagram illustrating a method for providing cross-carrier management for multiple timing advance groups in accordance with various embodiments.

Turning to FIG. 10A, a flow diagram of a method 1000-*a* for providing cross-carrier management for multiple timing advance groups is provided. Method 1000-*a* may be implemented various devices including, but not limited to, the base stations 105 described with reference to FIG. 1, FIG. 2, FIG. 4A, FIG. 4B, 4C, FIG. 9B, and/or device 900-*a* of FIG. 9A.

At block 1005, a timing advance group index may be generated. The timing advance group index may identify a timing advance group from multiple timing advance groups. Each group may include different sets of component carriers. At block 1010, the timing advance group index may be transmitted as part of a random access procedure.

In some embodiments, a first timing advance group from the multiple timing advance groups includes a primary component carrier and a second timing advance group includes at least one secondary component carrier. The first timing advance group may also include one or more secondary component carriers, while the second timing advance group does not include a primary component carrier. Some embodiments may also include additional timing advance groups besides the first and second timing advance group. The number of timing advance groups may depend upon a variety of factors including, but not limited, propagation delay characteristics, channel characteristics, user equipment device characteristics, and/or bandwidth characteristics of the component carriers.

In some embodiments, the timing advance group index is transmitted as a single bit of information. A first bit configuration of the single bit of information may indicate that the timing advance group includes a primary component carrier; a second bit configuration of the single bit may indicate that the timing advance group one or more secondary component carriers without the primary component carrier. Some embodiments may include timing advance indexes that may utilize additional bits to convey their information. The number of bits may depend upon the number of timing advance groups.

The timing advance group index may be transmitted as part of a MAC payload in some embodiments. The timing advance group index may be transmitted as part of a PDCCH payload. Some embodiments may also include transmitting a component carrier identifier as part of an RRC configuration to identify a component carrier within a timing advance group associated with a specific timing advance group index. The identified component carrier may be utilized for a random access attempt.

Some embodiments may enable cross-carrier random access response procedure management through the utilization of the timing advance group index. Some embodiments may enable cross-carrier PDCCH order through the utilization of the timing advance group index.

Figure 10B:
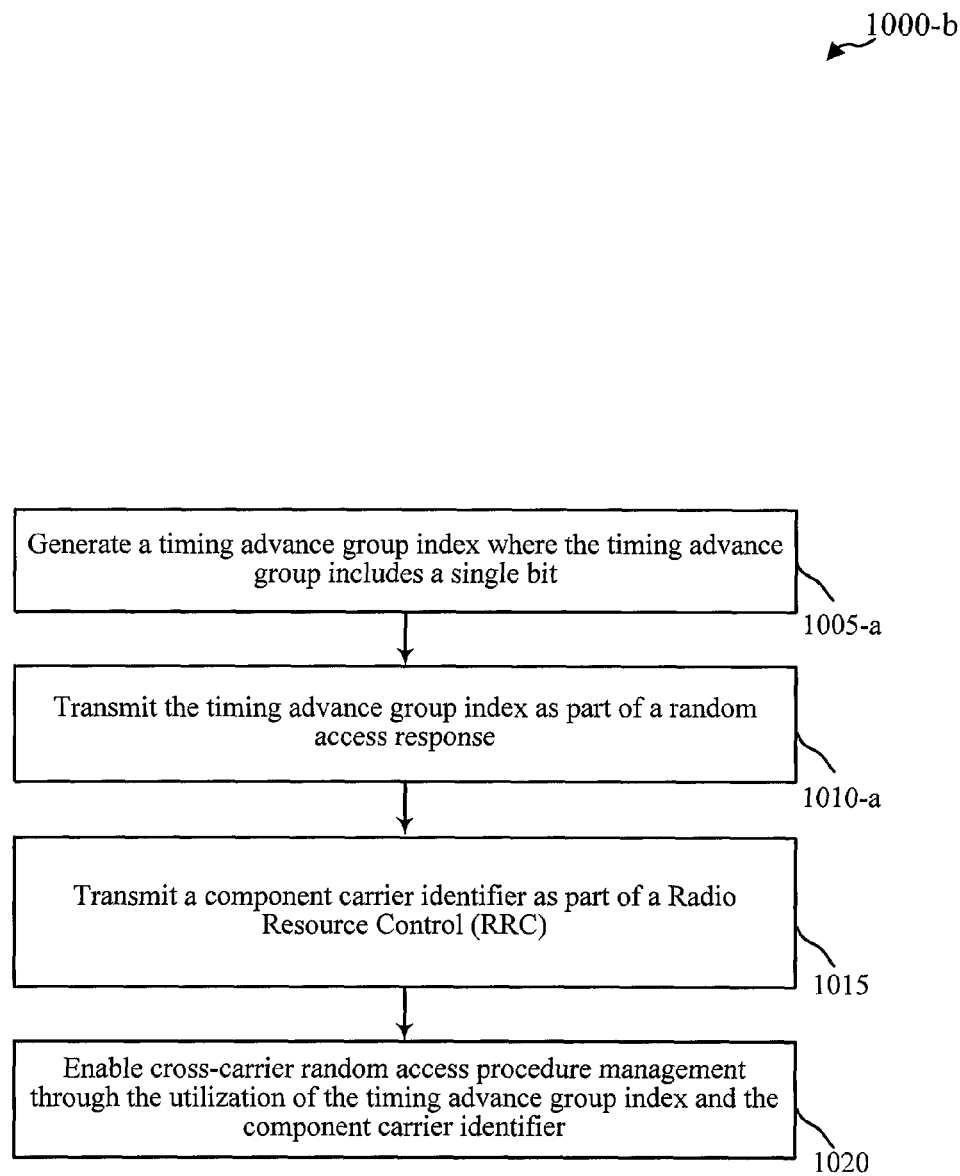
FIG. 10B is a flow diagram illustrating a method for providing cross-carrier management for multiple timing advance groups in accordance with various embodiments.

Turning to FIG. 10B, a flow diagram of a method 1000-*b* for providing cross-carrier management for multiple timing advance groups is provided. Method 1000-*b* may be implemented on various devices including, but not limited to, the base stations 105 described with reference to FIG. 1, FIG. 2, FIG. 4A, FIG. 4B, 4C, FIG. 9B, and/or device 900-*a* of FIG. 9A. Method 1000-*b* may be an example or utilize aspects of method 1000-*a* of FIG. 10A.

At block 1005-*a*, a timing advance group index may be generated that includes a single bit. The timing advance group index may identify a timing advance group from multiple timing advance groups. Each group may include different sets of component carriers. At block 1010-*a*, the timing advance group index may be transmitted as part of a random access response. At block 1015, a component carrier identifier may be transmitted as part of an RRC. At block 1020, cross-carrier random access procedure management may be enabled through the utilization of the timing advance group index and the component carrier identifier.

Figure 11A:
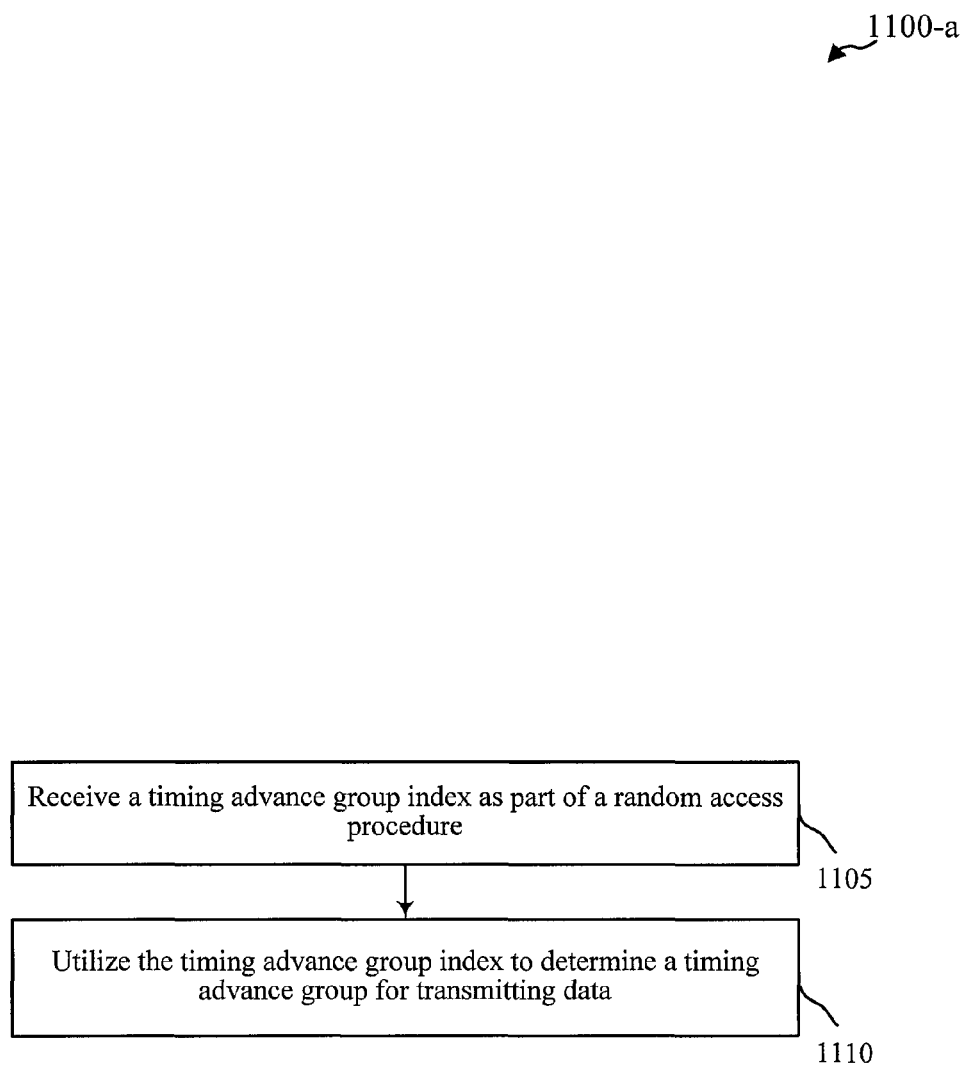
FIG. 11A is a flow diagram illustrating a method for providing cross-carrier management for multiple timing advance groups in accordance with various embodiments.

Turning to FIG. 11A, a flow diagram of a method 1100-*a* for providing cross-carrier management for multiple timing advance groups is provided. Method 1100-*a* may be implemented on various devices including, but not limited to, the user equipment 115 described with reference to FIG. 1, FIG. 2, FIG. 4A, FIG. 4B, 4C, FIG. 7B, FIG. 8B, FIG. 9B, and/or device 700-*a* of FIG. 7A and/or device 800-*a* of FIG. 8A.

At block 1105, a timing advance group index may be received as part of a random access procedure. At block 1110, the timing advance group index may be utilized to determine a timing advance group for transmitting data. Some embodiments may further include utilizing the timing advance group index to enable cross-carrier random access procedure management. Some embodiments may further include utilizing the timing advance group index to enable cross-carrier PDCCH order management. Some embodiments may further include receiving a component carrier identifier as part of an RRC configuration to identify a component carrier within a timing advance group associated with a specific timing advance group index. In some embodiments, the RRC configuration may be used to identify a DL component carrier which will serve as a timing reference for component carriers in multiple timing advance groups. For instance, a user equipment may utilize its RRC-configured primary component carrier as the timing reference for the component carriers in multiple timing advance groups as discussed in connection with FIG. 3B, or it may use another component carrier which is determined based on the RRC configuration for this purpose. Determining a DL reference carrier for multiple TA groups based on RRC configuration can improve the base station's flexibility to activate/deactivate secondary component carriers. Alternatively, the timing reference may be determine based on a SIB2 linkage as previously discussed.

Figure 11B:
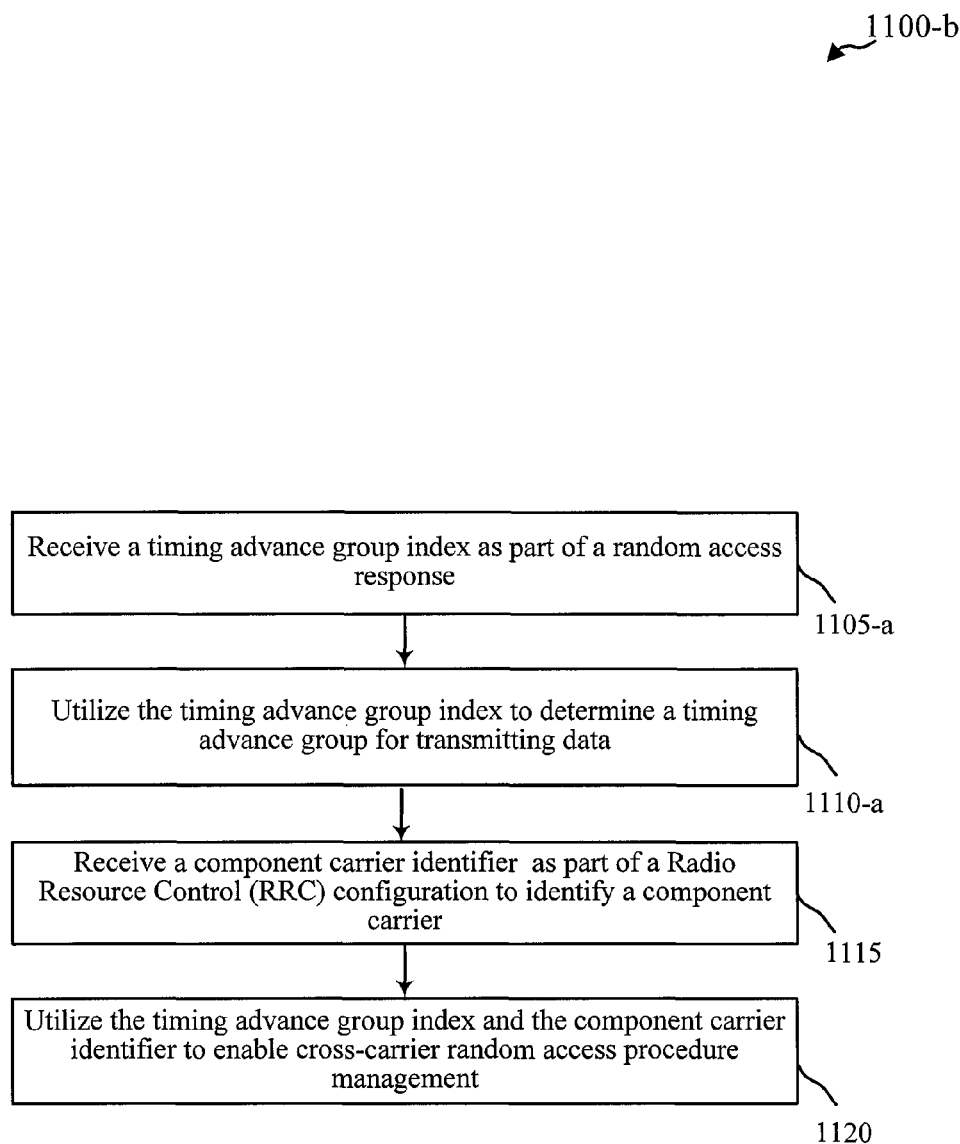
FIG. 11B is a flow diagram illustrating a method for providing cross-carrier management for multiple timing advance groups in accordance with various embodiments.

Turning to FIG. 11B, a flow diagram of a method 1100-*b* for providing cross-carrier management for multiple timing advance groups is provided. Method 1100-*b* may be implemented on various devices including, but not limited to, the user equipment 115 described with reference to FIG. 1, FIG. 2, FIG. 4A, FIG. 4B, 4C, FIG. 7B, FIG. 7B, FIG. 9B, and/or device 700-*a* of FIG. 7A and/or device 800-*a* of FIG. 8B. Method 1100-*b* may be an example of or utilize aspects of method 1100-*a* of FIG. 11A.

At block 1105-*a*, a timing advance group index may be received as part of a random access response. At block 1110-*b*, the timing advance group index may be utilized to determine a timing advance group for transmitting data. At block 1115, a component carrier identifier may be received as part of an RRC configuration to identify a component carrier within a timing advance group associated with a specific timing advance group index, wherein the identified component carrier is utilized for a random access response. At block 1120, the timing advance group index and the component carrier identifier may be utilized to enable cross-carrier random access procedure management.

Figure 12A:
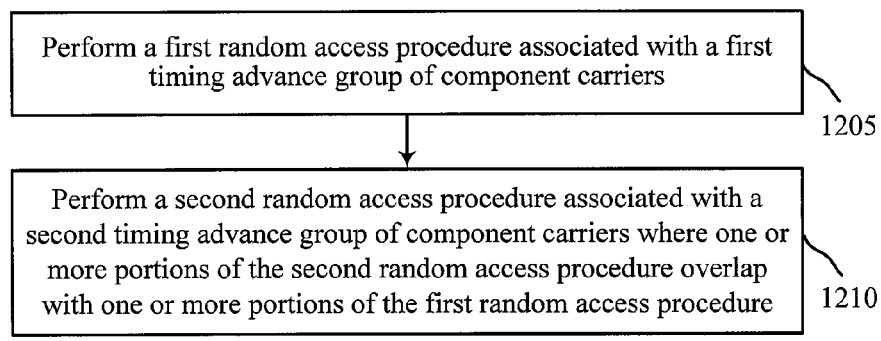
FIG. 12A is a flow diagram illustrating a method for performing multiple parallel random access procedures in accordance with various embodiments.

Turning to FIG. 12A, a flow diagram of a method 1200-*a* for performing multiple parallel random access procedures is provided. Method 1200-*a* may be implemented on systems and/or devices including, but not limited to, the user equipment 115 described with reference to FIG. 1, FIG. 2, FIG. 4A, FIG. 4B, 4C, FIG. 7B, FIG. 8B, FIG. 9B, and/or device 700-*a* of FIG. 7A and/or device 800-*a* of FIG. 8A. In some embodiments, method 1200-*a* may be implemented on systems and/or devices including, but not limited to, base stations 105 described with reference to FIG. 1, FIG. 2, FIG. 4A, FIG. 4B, 4C, FIG. 9B, and/or device 900-*a* of FIG. 9B.

At block 1205, a first random access procedure associated with a first timing advance group of component carriers may be performed. At block 1210, a second random access procedure associated with a second timing advance group of component carriers may be performed where one or more portions of the second random access procedure overlap with one or more portions of the first random access procedure.

Some embodiments of method 1200-*a* may include performing a power prioritization with respect to the first random access procedure and the second random access procedure. Performing the power prioritization may include performing an equal power scaling with respect to the first random access procedure and the second random access procedure. In some embodiments, performing the power prioritization may include transmitting a first random access attempt with respect to the first timing advance group of component carriers prior to transmitting a second random access attempt with respect to the second timing advance group of component carriers, where the first timing advance group of component carriers includes a primary component carrier.

In some embodiments, the first random access procedure may include a non-contention-based random access procedure and the second random access procedure may include a contention based random access procedure. Performing the power prioritization in this case may include transmitting a first random access attempt with respect to the first timing advance group of component carriers prior to transmitting a second random access attempt with respect to the second timing advance group of component carriers.

Method 1200-*a* may further include configuring a first subframe that includes a first random access response as part of the first random access procedure. A second subframe including a second random access response may be configured as part of the second random access procedure. The first subframe and the second subframe may be transmitted. As a result, the first and second random access responses may not be transmitted in the same subframe. Some embodiments may include triggering an aperiodic channel quality indicator (A-CQI).

Figure 12B:
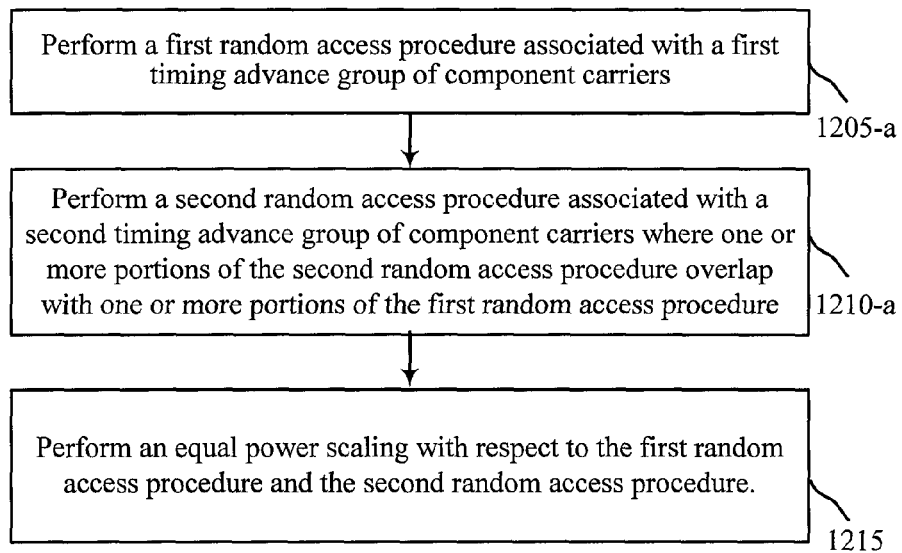
FIG. 12B is a flow diagram illustrating a method for performing multiple parallel random access procedures in accordance with various embodiments.

Turning to FIG. 12B, a flow diagram of a method 1200-*b* of performing multiple parallel random access procedures is provided. Method 1200-*b* may be implemented on systems and/or devices including, but not limited to, the user equipment 115 described with reference to FIG. 1, FIG. 2, FIG. 4A, FIG. 4B, 4C, FIG. 7B, FIG. 8B, FIG. 9B, and/or device 700-*a* of FIG. 7A and/or device 800-*a* of FIG. 8A. In some embodiments, method 1200-*b* may be implemented on systems and/or devices including, but not limited to, base stations 105 described with reference to FIG. 1, FIG. 2, FIG. 4A, FIG. 4B, 4C, FIG. 9B, and/or device 900-*a* of FIG. 9B. Method 1200-*b* may be an example of or utilize aspects of method 1200-*a* of FIG. 12A.

At block 1205-*a*, a first random access procedure associated with a first timing advance group of component carriers may be performed. At block 1210-*a*, a second random access procedure associated with a second timing advance group of component carriers may be performed where one or more portions of the second random access procedure overlap with one or more portions of the first random access procedure. At block 1215, an equal power scaling may be performed with respect to the first random access procedure and the second random access procedure.

Figure 13:
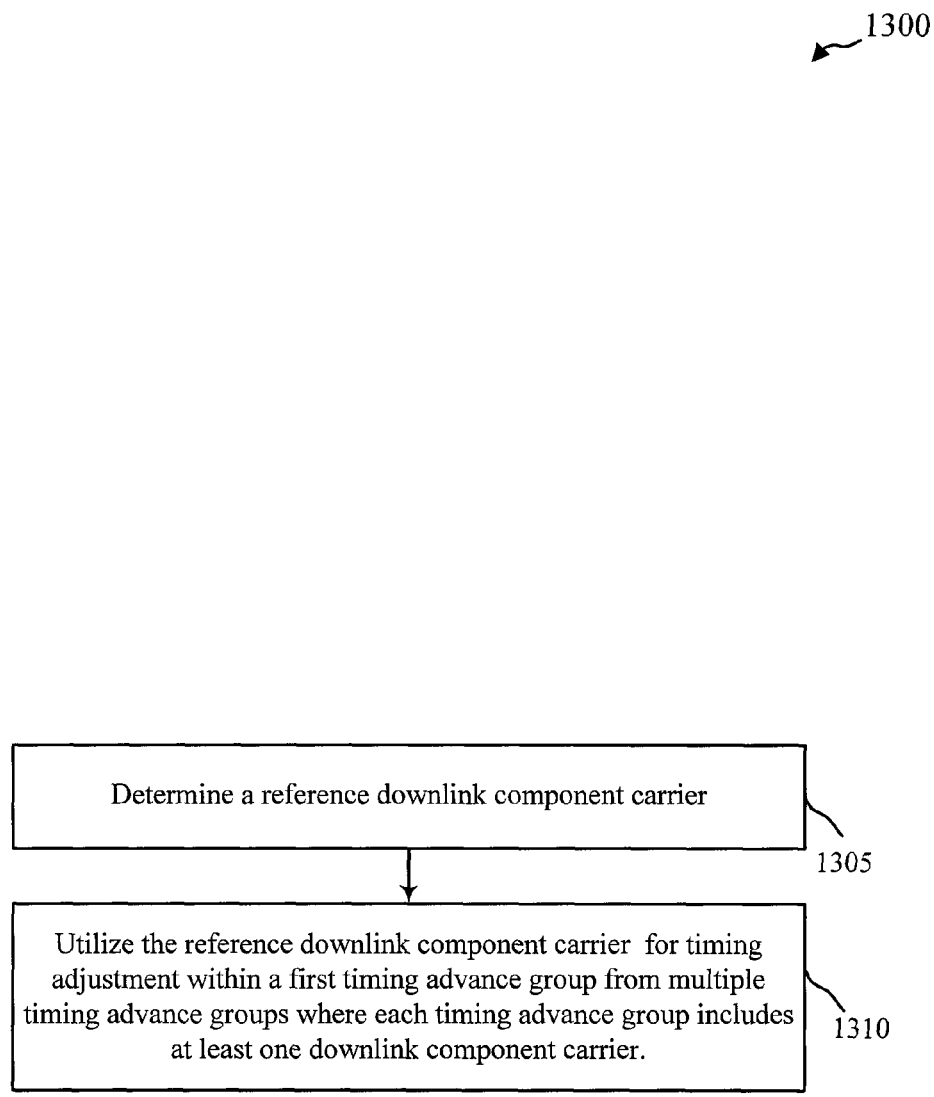
FIG. 13 shows a flow diagram of a method for utilizing timing advance group synchronization information.

FIG. 13 shows a flowchart of a method 1300 for utilizing timing advance group synchronization information. Method 1300 may be implemented on systems and/or devices including, but not limited to, the user equipment 115 described with reference to FIG. 1, FIG. 2, FIG. 4A, FIG. 4B, 4C, FIG. 7B, FIG. 8B, FIG. 9B, and/or device 700-*a* of FIG. 7A and/or device 800-*a* of FIG. 8A. In some embodiments, method 1300 may be implemented on systems and/or devices including, but not limited to, base stations 105 described with reference to FIG. 1, FIG. 2, FIG. 4A, FIG. 4B, 4C, FIG. 9B, and/or device 900-a of FIG. 9A.

At block 1305, a reference downlink component carrier may be determined. At block 1310, the reference downlink component carrier may be utilized for timing adjustment within a first timing advance group from multiple timing advance groups. Each timing advance group may include at least one downlink component carrier.

In some embodiments, a second timing advance group includes a primary component carrier. In some embodiments, determining the reference downlink component carrier includes utilizing a downlink component carrier linked with an uplink component carrier associated with a random access attempt to determine the reference downlink component carrier. The downlink component carrier may be linked with the uplink component carrier through a SIB2 linkage.

In some embodiments, determining the reference downlink component carrier may include determining the reference downlink component carrier from an RRC configuration. In some aspects, multiple timing advance groups may share a common reference downlink component carrier. The common reference may be the UE-specific primary component carrier. When more than one downlink carrier is designated as a PCC for a particular UE, there may be a many-to-one relationship between timing advance groups and each RRC-configured PCC. For instance, different PCCs may serve as reference carriers for different timing advance groups as determined by base station 105 based on channel and interference conditions experienced by the UE, system loading considerations of the component carriers, scheduling requirements, etc.

Figure 14:
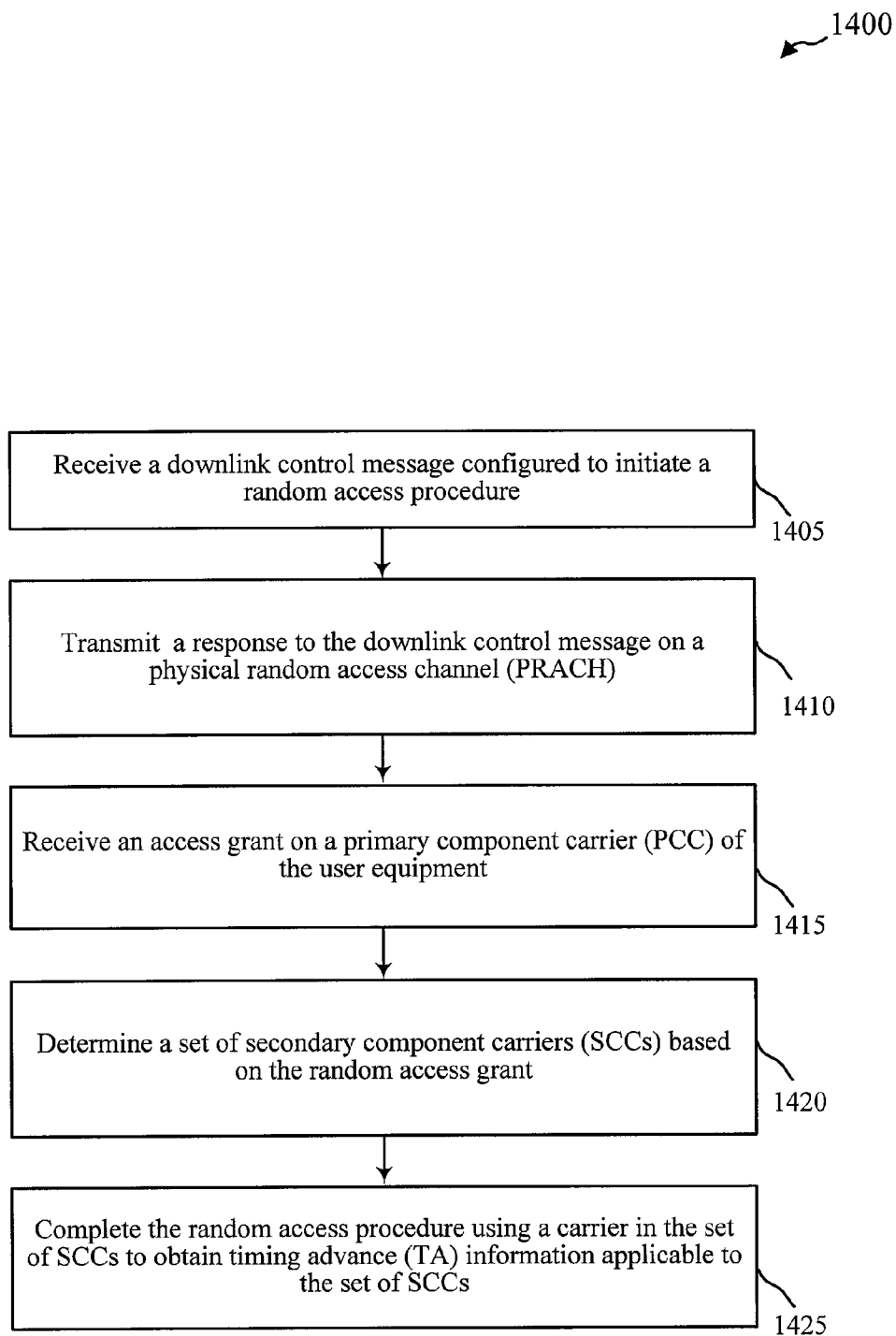
FIG. 14 shows a flow diagram of a method for performing random access by a multi-carrier user equipment.

Turning to FIG. 14, a flow diagram of a method 1400 for performing random access by a multi-carrier UE is provided. Method 1400 may be implemented on various devices including, but not limited to, the user equipment 115 described with reference to FIG. 1, FIG. 2, FIG. 4A, FIG. 4B, 4C, FIG. 7B, FIG. 8B, FIG. 9B, and/or device 700-a of FIG. 7A and/or device 800-a of FIG. 8A.

At block 1405, a downlink control message configured to initiate a random access procedure is received by the UE. For example, the downlink control message may include a message 0 transmission as previously discussed. At block 1410, the UE transmits a response to the downlink control message on a PRACH. The CC for transmitting the PRACH may be determined based on an indicator carried with the message 0 transmission and/or based on an association with the CC on which the message 0 was received. At block 1415, the UE receives an access grant on PCC. At block 1420, the UE determines a set of SCCs based on the random access grant. The random access grant may enable cross-carrier RAR and the UE may determine the set of SCC based on information in the RAR message or corresponding PDCCH payload. At block 1425, the UE may complete the random access procedure using a carrier in the set of SCCs to obtain TA information applicable to the set of SCCs.

Receiving the downlink control message may include detecting a PDCCH message in a UE-specific search space. Receiving the random access grant may include detecting a PDCCH message in a common search space of the PCC.

In some embodiments, the method 1400 may further include obtaining a MAC protocol data unit with the random access grant. A TA group index may be determined corresponding to the set of SCCs based on the MAC PDU. Some embodiments may further include receiving a configuration of TA groups corresponding to component carriers configured for the UE. The configuration of TA groups may include at least a first TA group including the PCC, and a second TA group including only SCCs in a set of secondary CCs. Some embodiments may further include determining a reference downlink CC for completing the random access procedure based on the TA group index. In some embodiments, the method 1400 may further include determining a TA group index corresponding to the set of SCCs as part of a PDCCH payload.

In some embodiments, the downlink control message may be configured to initiate the random access procedure comprises an identifier corresponding to the set of SCCs. Transmitting the response to the downlink control message further include determining an SCC to transmit the PRACH based on the identifier.

In some embodiments, method 1400 may further include initiating a second random access procedure concurrently with the first random access procedure. Some embodiments may further include determining a priority for allocating power between the first random access procedure and the second random access procedure. Some embodiments may further include allocating power to the first random access procedure at a higher priority than the second random access procedure when the first random access procedure comprises a contention-free random access procedure and the second random access procedure comprises a contention-based random access procedure. Some embodiments may further include allocating power to the second random access procedure at a higher priority than the first random access procedure when the second random access procedure when the second random access procedure is performed in relation to a group of carriers comprising a primary component carrier of the UE. Determining the priority may include performing an equal power scaling for each CC.

Figure 15:
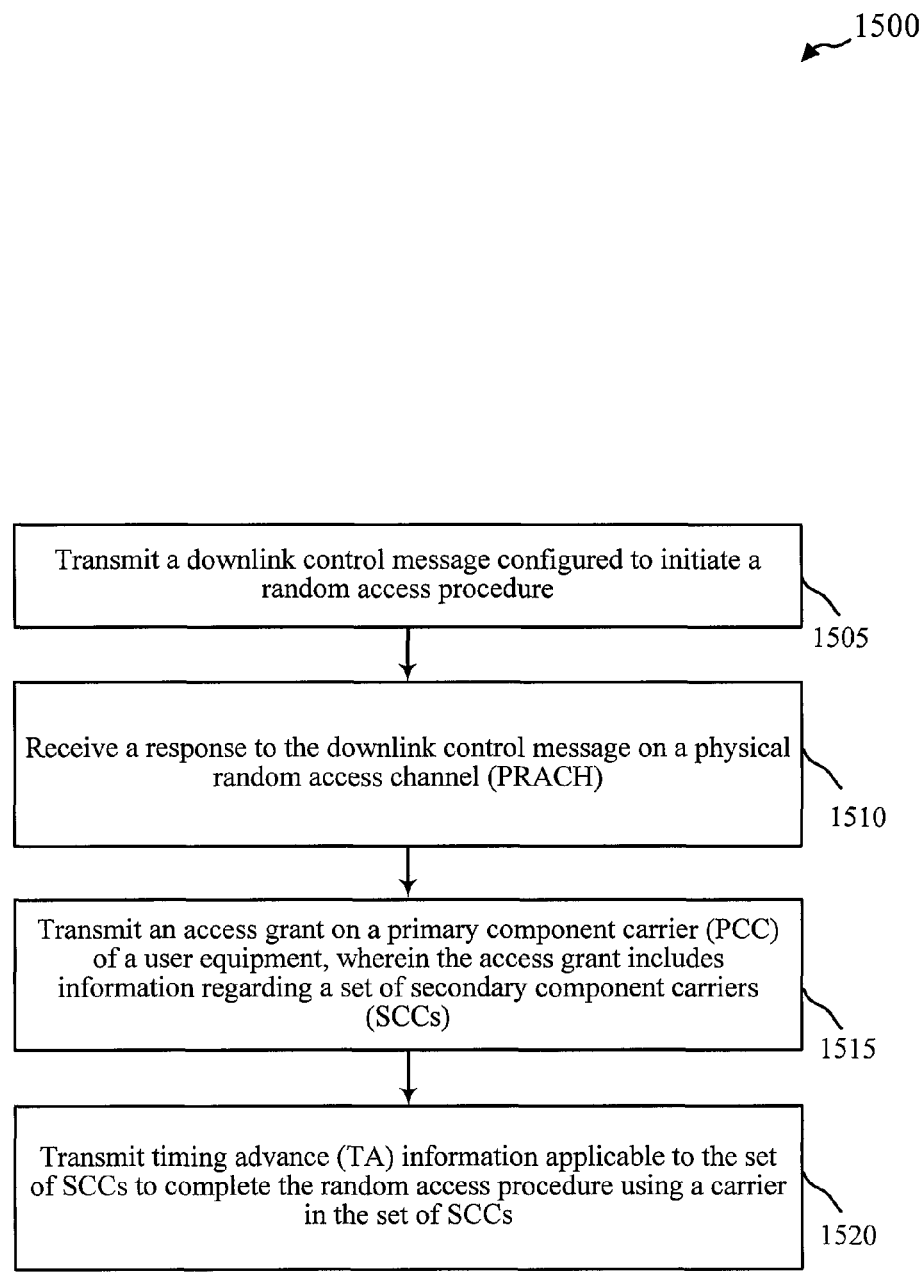
FIG. 15 shows a flow diagram of a method for performing random access by a base station.

Turning to FIG. 15, a flow diagram of a method 1500 for performing random access by a base station is provided. Method 1500 may be implemented on various devices including, but not limited to, the base stations 105 described with reference to FIG. 1, FIG. 2, FIG. 4A, FIG. 4B, 4C, FIG. 9B, and/or device 900-a of FIG. 9A.

At block 1505, a downlink control message configured to initiate a random access procedure may be transmitted. At block 1510, a response to the downlink control message may be received on a PRACH. At block 1515, an access grant may be transmitted on a PCC of a user equipment, wherein the access grant includes information regarding a set of SCCs. At block 1520, TA information applicable to the set of SCCs may be transmitted to complete the random access procedure using a carrier in the set of SCCs.

Transmitting the downlink control message may include transmitting a PDCCH message in a UE-specific search space. Transmitting the random access grant may include transmitting a PDCCH message in a common search space of the PCC.

In some embodiments, method 1500 may further include transmitting a medium access control (MAC) protocol data unit (PDU) with the random access grant. A TA group index corresponding to the set of SCCs with the random access grant may be transmitted. A configuration of TA groups corresponding to component carriers configured for the UE may be transmitted. The TA group index may be transmitted as part of the MAC PDU. The configuration of TA groups may include at least a first TA group including the PCC, and a second TA group including the set of secondary CCs. A reference downlink CC may be transmitted for completing the random access procedure based on the TA group index.

In some embodiments, method 1500 may further include transmitting a TA group index corresponding to the set of SCCs as part of a PDCCH payload. In some embodiments, the downlink control message configured to initiate the random access procedure may include an identifier corresponding to the set of SCCs. Receiving the response to the downlink control message may further include receiving the PRACH on an SCC based on the identifier.

Figure 16:
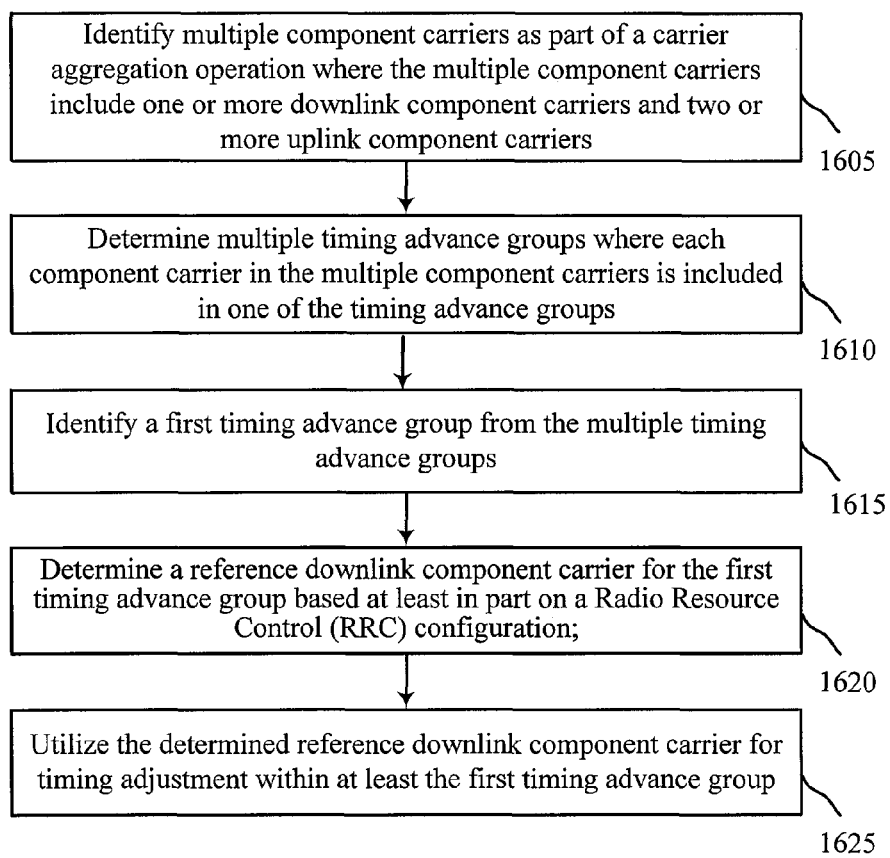
FIG. 16 shows a flow diagram of a method for utilizing timing advance group synchronization information in accordance with various embodiments.

Turning to FIG. 16, a flow diagram of a method 1600 for utilizing timing advance group synchronization information in accordance with various embodiments. Method 1600 may be implemented on various devices including, but not limited to, the user equipment 115 described with reference to FIG. 1, FIG. 2, FIG. 4A, FIG. 4B, 4C, FIG. 7B, FIG. 8B, FIG. 9B, and/or device 700-a of FIG. 7A and/or device 800-a of FIG. 8A.

At block 1605, multiple component carriers as part of a carrier aggregation operation may be identified. The multiple component carriers may include one or more downlink component carriers and two or more uplink component carriers. At block 1610, multiple timing advance groups may be determined. Each component carrier in the multiple component carriers may be included in one of the timing advance groups. At block 1615, a first timing advance group from the multiple timing advance groups may be identified. At block 1620, a reference downlink component carrier may be determined for the first timing advance group based at least in part on an RRC configuration. At block 1625, the determined reference downlink component carrier may be utilized for timing adjustment within at least the first timing advance group.

In some embodiments, the method further includes receiving an indication of a primary downlink component carrier through the RRC configuration. The primary downlink component carrier may be the determined reference downlink component carrier.

Some embodiments include utilizing the primary downlink component carrier for timing adjustment within a second timing advance group from the multiple timing advance groups. The primary downlink component carrier may be included in the second timing advance group.

One or more downlink component carriers of the one or more identified downlink carriers may be included in the first timing advance group. Determining the reference downlink component carrier may be based on an RRC configuration for the one or more downlink component carriers in the first timing advance group. The reference downlink component carrier for the first timing advance group may be determined to be a downlink component carrier with a smallest cell index of multiple cell indices configured for each one of the one or more downlink component carriers in the first timing advance group.

The reference downlink component carrier may be determined from a set of activated downlink component carriers. The one or more downlink component carriers and the two or more uplink component carriers may be associated with two or more bands. The reference downlink component carrier for the first timing advance group may be determined from a set of downlink component carriers of the same band or similar band. As an example, the reference downlink component carrier may be determined to be a downlink component carrier of the same or similar band as an uplink component carrier associated with a random access attempt for the first timing advance group.

Some embodiments include performing multiple random access procedures in parallel with respect to two or more of the multiple timing advance groups. Performing the multiple random access procedures may include performing a first random access procedure linked with the first timing advance group; and/or performing a second random access procedure linked with a second timing advance group of the multiple timing advance groups, where one or more portions of the second random access procedure overlap with one or more portions of the first random access procedure.

Some embodiments include initiating a non-contention based random access procedure on an uplink component carrier within the first timing advance group through utilizing a downlink control channel transmitted on a downlink component carrier that is not linked with the uplink component carrier via a system information block broadcast. A cross-carrier indication field may be included in the downlink control channel to enable cross-carrier scheduling.

The reference downlink component carrier for the first timing advance group may be determined from a set of downlink component carriers with a similar delay due to downlink repeaters. The reference downlink component carrier for the first timing advance group may be determined from a set of downlink component carriers with a same carrier type where the carrier type includes at least a legacy carrier type or a new carrier type. The reference downlink component carrier for the first timing advance group may be determined from a set of downlink component carriers with a similar activity factor.

Method 1600 may take into account different characteristics of a component carrier (e.g., whether it is equipped with a repeater, whether it is always on or periodically turned off, whether it is a new or legacy carrier type, etc.) in determining the reference downlink component carrier. A component carrier may be equipped with a repeater while another component carrier is not. In determining the reference downlink component carrier for a given timing advance group, the component carriers of the same or similar delay characteristics due to repeaters (either downlink repeaters, or uplink repeaters, or a combination thereof) may be determined to be possible candidates for the reference downlink component carrier for the given timing advance group. Different component carriers may have different activity factors. A component carrier may periodically be turned on and carries much less frequent downlink information compared with a regular carrier. It may then be preferable to avoid using this component carrier as the reference downlink component carrier. A component carrier may be of a legacy carrier type and another can be of a new carrier type. Carriers of the same type may be determined to be possible candidates for the reference downlink component carrier for a given timing advance group.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes computer storage media. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable storage media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for utilizing timing advance group synchronization information, the method comprising:
   identifying a plurality of component carriers as part of a carrier aggregation operation, the plurality of component carriers comprising one or more downlink component carriers and two or more uplink component carriers;
   determining a plurality of timing advance groups, wherein each component carrier in the plurality of component carriers is included in one of the timing advance groups;
   identifying a first timing advance group from the plurality of timing advance groups, wherein the first timing advance group does not include a primary component carrier;
   determining a reference downlink component carrier for the first timing advance group based at least in part on a Radio Resource Control (RRC) configuration; and
   utilizing the determined reference downlink component carrier for timing adjustment within at least the first timing advance group.

2. The method of claim 1, wherein:
   one or more downlink component carriers of the one or more identified downlink carriers are included in the first timing advance group; and
   determining the reference downlink component carrier is based on an RRC configuration for the one or more downlink component carriers in the first timing advance group.

3. The method of claim 2, wherein the reference downlink component carrier for the first timing advance group is determined to be a downlink component carrier with a smallest cell index of a plurality of cell indices configured for each one of the one or more downlink component carriers in the first timing advance group.

4. The method of claim 1, wherein the reference downlink component carrier is determined from a set of activated downlink component carriers.

5. The method of claim 1, wherein the one or more downlink component carriers and the two or more uplink component carriers are associated with two or more bands.

6. The method of claim 5, wherein the reference downlink component carrier for the first timing advance group is determined from a set of downlink component carriers of at least a same band or a similar band as an uplink component carrier associated with a random access attempt for the first timing advance group.

7. The method of claim 1, further comprising:
   performing a plurality of random access procedures in parallel with respect to two or more of the plurality of timing advance groups.

8. The method of claim 7, wherein performing the plurality of random access procedures comprises:
   performing a first random access procedure linked with the first timing advance group; and
   performing a second random access procedure linked with a second timing advance group of the plurality of timing advance groups, wherein one or more portions of the second random access procedure overlap with one or more portions of the first random access procedure.

9. The method of claim 1, further comprising:
   initiating a non-contention based random access procedure on an uplink component carrier within the first timing advance group through utilizing a downlink control channel transmitted on a downlink component carrier that is not linked with the uplink component carrier via a system information block broadcast.

10. The method of claim 9, wherein a cross-carrier indication field is included in the downlink control channel to enable cross-carrier scheduling.

11. The method of claim 1, wherein the reference downlink component carrier for the first timing advance group is determined from a set of downlink component carriers with a similar delay due to downlink repeaters.

12. The method of claim 1, wherein the reference downlink component carrier for the first timing advance group is determined from a set of downlink component carriers with a same type of carrier, wherein the type of carrier includes at least a legacy type of carrier or a new type of carrier.

13. The method of claim 1, wherein the reference downlink component carrier for the first timing advance group is determined from a set of downlink component carriers with a similar activity factor.

14. A method for utilizing timing advance group synchronization information, the method comprising:
   identifying a plurality of component carriers as part of a carrier aggregation operation, the plurality of component carriers comprising one or more downlink component carriers and two or more uplink component carriers;
   determining a plurality of timing advance groups, wherein each component carrier in the plurality of component carriers is included in one of the timing advance groups;
   identifying a first timing advance group from the plurality of timing advance groups;
   receiving an indication of a primary downlink component carrier through a Radio Resource Control (RRC) configuration;
   determining a reference downlink component carrier for the first timing advance group based at least in part on the RRC configuration;
   utilizing the determined reference downlink component carrier for timing adjustment within at least the first timing advance group; and
   utilizing the primary downlink component carrier for timing adjustment within a second timing advance group from the plurality of timing advance groups, wherein the primary downlink component carrier is included in the second timing advance group.

15. The method of claim 14, wherein the primary downlink component carrier is the determined reference downlink component carrier.

16. A wireless communications system configured for utilizing timing advance group synchronization information, the system comprising:
   means for identifying a plurality of component carriers as part of a carrier aggregation operation, the plurality of component carriers comprising one or more downlink component carriers and two or more uplink component carriers;
   means for determining a plurality of timing advance groups, wherein each component carrier in the plurality of component carriers is included in one of the plurality of timing advance groups;
   means for identifying a first timing advance group from the plurality of timing advance groups, wherein the first timing advance group does not include a primary component carrier;
   means for determining a reference downlink component carrier for the first timing advance group based at least in part on a Radio Resource Control (RRC) configuration; and
   means for utilizing the determined reference downlink component carrier for timing adjustment within at least the first timing advance group.

17. The wireless communications system of claim 16, wherein:
   one or more downlink component carriers of the one or more identified downlink carriers are included in the first timing advance group; and
   determining the reference downlink component carrier is based on an RRC configuration for the one or more downlink component carriers in the first timing advance group.

18. The wireless communications system of claim 17, wherein the reference downlink component carrier for the first timing advance group is determined to be a downlink component carrier with a smallest cell index of a plurality of cell indices configured for each one of the one or more downlink component carriers in the first timing advance group.

19. The wireless communications system of claim 16, wherein the reference downlink component carrier is determined from a set of activated downlink component carriers.

20. The wireless communications system of claim 16, wherein the one or more downlink component carriers and the two or more uplink component carriers are associated with two or more bands.

21. The wireless communications system of claim 20, wherein the reference downlink component carrier for the first timing advance group is determined from a set of downlink component carriers of at least a same band or a similar band as an uplink component carrier associated with a random access attempt for the first timing advance group.

22. The wireless communications system of claim 16, further comprising:
   means for performing a plurality of random access procedures in parallel with respect to two or more of the plurality of timing advance groups.

23. The wireless communications system of claim 22, wherein the means for performing the plurality of random access procedures comprises:
   means for performing a first random access procedure linked with the first timing advance group; and
   means for performing a second random access procedure linked with a second timing advance group of the plurality of timing advance groups, wherein one or more portions of the second random access procedure overlap with one or more portions of the first random access procedure.

24. The wireless communications system of claim 16, further comprising:
   means for initiating a non-contention based random access procedure on an uplink component carrier within the first timing advance group through utilizing a downlink control channel transmitted on a downlink component carrier that is not linked with the uplink component carrier via a system information block broadcast.

25. The wireless communications system of claim 24, wherein a cross-carrier indication field is included in the downlink control channel to enable cross-carrier scheduling.

26. The wireless communications system of claim 16, wherein the reference downlink component carrier for the first timing advance group is determined from a set of downlink component carriers with a similar delay due to downlink repeaters.

27. The wireless communications system of claim 16, wherein the reference downlink component carrier for the first timing advance group is determined from a set of downlink component carriers with a same type of carrier, wherein the type of carrier includes at least a legacy type of carrier or a new type of carrier.

28. The wireless communications system of claim 16, wherein the reference downlink component carrier for the first timing advance group is determined from a set of downlink component carriers with a similar activity factor.

29. A wireless communications system configured for utilizing timing advance group synchronization information, the system comprising:
- means for identifying a plurality of component carriers as part of a carrier aggregation operation, the plurality of component carriers comprising one or more downlink component carriers and two or more uplink component carriers;
- means for determining a plurality of timing advance groups, wherein each component carrier in the plurality of component carriers is included in one of the plurality of timing advance groups;
- means for identifying a first timing advance group from the plurality of timing advance groups;
- means for receiving an indication of a primary downlink component carrier through a Radio Resource Control (RRC) configuration;
- means for determining a reference downlink component carrier for the first timing advance group based at least in part on the RRC configuration;
- means for utilizing the determined reference downlink component carrier for timing adjustment within at least the first timing advance group; and
- means for utilizing the primary downlink component carrier for timing adjustment within a second timing advance group from the plurality of timing advance groups, wherein the primary downlink component carrier is included in the second timing advance group.

30. The wireless communications system of claim 29, wherein the primary downlink component carrier is the determined reference downlink component carrier.

31. A non-transitory computer-readable storage medium for utilizing timing advance group synchronization information, the non-transitory computer-readable storage medium comprising:
- code for identifying a plurality of component carriers as part of a carrier aggregation operation, the plurality of component carriers comprising one or more downlink component carriers and two or more uplink component carriers;
- code for determining a plurality of timing advance groups, wherein each component carrier in the plurality of component carriers is included in one of the timing advance groups;
- code for identifying a first timing advance group from the plurality of timing advance groups, wherein the first timing advance group does not include a primary component carrier;
- code for determining a reference downlink component carrier for the first timing advance group based at least in part on a Radio Resource Control (RRC) configuration; and
- code for utilizing the determined reference downlink component carrier for timing adjustment within at least the first timing advance group.

32. The non-transitory computer-readable storage medium of claim 31, wherein:
- one or more downlink component carriers of the one or more identified downlink carriers are included in the first timing advance group; and
- determining the reference downlink component carrier is based on an RRC configuration for the one or more downlink component carriers in the first timing advance group.

33. The non-transitory computer-readable storage medium of claim 32, wherein the reference downlink component carrier for the first timing advance group is determined to be a downlink component carrier with a smallest cell index of a plurality of cell indices configured for each one of the one or more downlink component carriers in the first timing advance group.

34. The non-transitory computer-readable storage medium of claim 31, wherein the reference downlink component carrier is determined from a set of activated downlink component carriers.

35. The non-transitory computer-readable storage medium of claim 31, wherein the one or more downlink component carriers and the two or more uplink component carriers are associated with two or more bands.

36. The non-transitory computer-readable storage medium of claim 35, wherein the reference downlink component carrier for the first timing advance group is determined from a set of downlink component carriers of at least a same band or a similar band as an uplink component carrier associated with a random access attempt for the first timing advance group.

37. The non-transitory computer-readable storage medium of claim 31, wherein the non-transitory computer-readable storage medium further comprises:
- code for performing a plurality of random access procedures in parallel with respect to two or more of the plurality of timing advance groups.

38. The non-transitory computer-readable storage medium of claim 37, wherein the code for performing the plurality of random access procedures comprises:
- code for performing a first random access procedure linked with the first timing advance group; and
- code for performing a second random access procedure linked with a second timing advance group of the plurality of timing advance groups, wherein one or more portions of the second random access procedure overlap with one or more portions of the first random access procedure.

39. The non-transitory computer-readable storage medium of claim 31, wherein the non-transitory computer-readable storage medium further comprises:
- code for initiating a non-contention based random access procedure on an uplink component carrier within the first timing advance group through utilizing a downlink control channel transmitted on a downlink component carrier that is not linked with the uplink component carrier via a system information block broadcast.

40. The non-transitory computer-readable storage medium of claim 39, wherein a cross-carrier indication field is included in the downlink control channel to enable cross-carrier scheduling.

41. The non-transitory computer-readable storage medium of claim 31, wherein the reference downlink component carrier for the first timing advance group is determined from a set of downlink component carriers with a similar delay due to downlink repeaters.

42. The non-transitory computer-readable storage medium of claim 31, wherein the reference downlink component carrier for the first timing advance group is determined from a set of downlink component carriers with a same type of carrier, wherein the type of carrier includes at least a legacy type of carrier or a new type of carrier.

43. The non-transitory computer-readable storage medium of claim 31, wherein the reference downlink component carrier for the first timing advance group is determined from a set of downlink component carriers with a similar activity factor.

44. A non-transitory computer-readable storage medium for utilizing timing advance group synchronization information, the non-transitory computer-readable storage medium comprising:
- code for identifying a plurality of component carriers as part of a carrier aggregation operation, the plurality of component carriers comprising one or more downlink component carriers and two or more uplink component carriers;
- code for determining a plurality of timing advance groups, wherein each component carrier in the plurality of component carriers is included in one of the timing advance groups;
- code for identifying a first timing advance group from the plurality of timing advance groups;
- code for receiving an indication of a primary downlink component carrier through a Radio Resource Control (RRC) configuration;
- code for determining a reference downlink component carrier for the first timing advance group based at least in part on the RRC configuration;
- code for utilizing the determined reference downlink component carrier for timing adjustment within at least the first timing advance group; and
- code for utilizing the primary downlink component carrier for timing adjustment within a second timing advance group from the plurality of timing advance groups, wherein the primary downlink component carrier is included in the second timing advance group.

45. The non-transitory computer-readable storage medium of claim 44, wherein the primary downlink component carrier is the determined reference downlink component carrier.

46. A wireless communications device configured utilizing timing advance group synchronization information, the device comprising:
- at least one processor configured to:
  - identify a plurality of component carriers as part of a carrier aggregation operation, the plurality of component carriers comprising one or more downlink component carriers and two or more uplink component carriers;
  - determine a plurality of timing advance groups, wherein each component carrier in the plurality of component carriers is included in one of the timing advance groups;
  - identify a first timing advance group from the plurality of timing advance groups wherein the first timing advance group does not include a primary component carrier;
  - determine a reference downlink component carrier for the first timing advance group based at least in part on a Radio Resource Control (RRC) configuration; and
  - utilize the determined reference downlink component carrier for timing adjustment within at least the first timing advance group; and
- at least one memory coupled with the at least one processor.

47. The wireless communications device of claim 46, wherein:
- one or more downlink component carriers of the one or more identified downlink carriers are included in the first timing advance group; and
- determining the reference downlink component carrier is based on an RRC configuration for the one or more downlink component carriers in the first timing advance group.

48. The wireless communications device of claim 47, wherein the reference downlink component carrier for the first timing advance group is determined to be a downlink component carrier with a smallest cell index of a plurality of cell indices configured for each one of the one or more downlink component carriers in the first timing advance group.

49. The wireless communications device of claim 46, wherein the reference downlink component carrier is determined from a set of activated downlink component carriers.

50. The wireless communications device of claim 46, wherein the one or more downlink component carriers and the two or more uplink component carriers are associated with two or more bands.

51. The wireless communications device of claim 50, wherein the reference downlink component carrier for the first timing advance group is determined from a set of downlink component carriers of at least a same band or a similar band as an uplink component carrier associated with a random access attempt for the first timing advance group.

52. The wireless communications device of claim 46, wherein the at least one processor is further configured to:
- perform a plurality of random access procedures in parallel with respect to two or more of the plurality of timing advance groups.

53. The wireless communications device of claim 52, wherein the at least one processor configured to perform the plurality of random access procedures is configured to:
- perform a first random access procedure linked with the first timing advance group; and
- perform a second random access procedure linked with a second timing advance group of the plurality of timing advance groups, wherein one or more portions of the second random access procedure overlap with one or more portions of the first random access procedure.

54. The wireless communications device of claim 46, wherein the at least one processor is further configured to:
- initiate a non-contention based random access procedure on an uplink component carrier within the first timing advance group through utilizing a downlink control channel transmitted on a downlink component carrier that is not linked with the uplink component carrier via a system information block broadcast.

55. The wireless communications device of claim 54, wherein a cross-carrier indication field is included in the downlink control channel to enable cross-carrier scheduling.

56. The wireless communications device of claim 46, wherein the reference downlink component carrier for the first timing advance group is determined from a set of downlink component carriers with a similar delay due to downlink repeaters.

57. The wireless communications device of claim 46, wherein the reference downlink component carrier for the first timing advance group is determined from a set of downlink component carriers with a same type of carrier, wherein the type of carrier includes at least a legacy type of carrier or a new type of carrier.

58. The wireless communications device of claim 46, wherein the reference downlink component carrier for the first timing advance group is determined from a set of downlink component carriers with a similar activity factor.

59. A wireless communications device configured utilizing timing advance group synchronization information, the device comprising:
- at least one processor configured to:
  - identify a plurality of component carriers as part of a carrier aggregation operation, the plurality of component carriers comprising one or more downlink component carriers and two or more uplink component carriers;

determine a plurality of timing advance groups, wherein each component carrier in the plurality of component carriers is included in one of the timing advance groups;

identify a first timing advance group from the plurality of timing advance groups;

receive an indication of a primary downlink component carrier through a Radio Resource Control (RRC) configuration;

determine a reference downlink component carrier for the first timing advance group based at least in part on the RRC configuration;

utilize the determined reference downlink component carrier for timing adjustment within at least the first timing advance group; and utilize the primary downlink component carrier for timing adjustment within a second timing advance group from the plurality of timing advance groups, wherein the primary downlink component carrier is included in the second timing advance group; and at least one memory coupled with the at least one processor.

60. The wireless communications device of claim 59, wherein the primary downlink component carrier is the determined reference downlink component carrier.

* * * * *